(12) United States Patent
Fischer, Jr.

(10) Patent No.: US 6,199,388 B1
(45) Date of Patent: Mar. 13, 2001

(54) SYSTEM AND METHOD FOR CONTROLLING TEMPERATURE AND HUMIDITY

(75) Inventor: John C. Fischer, Jr., Marietta, GA (US)

(73) Assignee: Semco Incorporated, Columbia, MO (US)

(*) Notice: Subject to any disclaimer, the term of this patent is extended or adjusted under 35 U.S.C. 154(b) by 0 days.

(21) Appl. No.: 09/271,046

(22) Filed: Mar. 10, 1999

(51) Int. Cl.[7] ............................. F25D 17/06; F25D 23/00
(52) U.S. Cl. .................... 62/90; 62/94; 62/271; 96/125
(58) Field of Search .................. 62/90, 94, 271; 96/125, 126

(56) References Cited

U.S. PATENT DOCUMENTS

| | | | |
|---|---|---|---|
| 3,009,684 | 11/1961 | Munters | 257/267 |
| 3,144,901 | 8/1964 | Meek | 165/6 |
| 3,844,737 | 10/1974 | Macriss et al. | 55/34 |
| 4,484,938 | 11/1984 | Okamoto et al. | 55/269 |
| 4,582,129 | 4/1986 | Yano et al. | 165/97 |
| 4,594,860 | 6/1986 | Coellner et al. | 62/271 |
| 4,719,761 * | 1/1988 | Cromer | 62/271 |
| 4,723,417 | 2/1988 | Meckler | 62/271 |
| 4,729,774 | 3/1988 | Cohen et al. | 55/181 |
| 4,769,053 | 9/1988 | Fischer, Jr. | 55/389 |
| 4,955,205 | 9/1990 | Wilkinson | 62/94 |
| 5,170,633 | 12/1992 | Kaplan | 62/94 |
| 5,176,005 | 1/1993 | Kaplan | 62/94 |
| 5,300,138 | 4/1994 | Fischer et al. | 96/125 |
| 5,373,704 | 12/1994 | McFadden | 62/94 |
| 5,401,706 | 3/1995 | Fischer | 502/401 |
| 5,448,895 | 9/1995 | Coellner et al. | 62/94 |
| 5,496,397 | 3/1996 | Fischer et al. | 96/154 |
| 5,517,828 | 5/1996 | Calton et al. | 62/271 |
| 5,526,651 | 6/1996 | Worek et al. | 62/271 |
| 5,542,259 | 8/1996 | Worek et al. | 62/94 |
| 5,551,245 | 9/1996 | Calton et al. | 62/90 |
| 5,579,647 | 12/1996 | Calton et al. | 62/94 |
| 5,649,428 | 7/1997 | Calton et al. | 62/94 |
| 5,660,048 | 8/1997 | Belding et al. | 62/94 |
| 5,727,394 | 3/1998 | Belding et al. | 62/94 |
| 5,758,511 | 6/1998 | Yoho et al. | 62/271 |
| 5,761,915 | 6/1998 | Rao | 62/94 |
| 5,771,707 | 6/1998 | Lagace''t et al. | 62/271 |
| 5,943,874 * | 8/1999 | Maeda | 62/271 |

OTHER PUBLICATIONS

R. DiBlasio, "Conditioning a Research Facility," *Engineered Systems* (Sep. 1995).
C. Downing, "No Place Like Home," *Engineered Systems* (1996).
Semco Incorporated, *Energy Recovery Products* (1998).
US. Dept. of Energy, "Federal Technology Alerts—Two–Wheel Desiccant Dehumidification System" (Apr. 1997).
J. Smith, "Schools Resolve IAQ/Humidity Problems with Desiccant Preconditioning" (1996).
J. Swails et al., "A Cure For Growing Pains," Consulting Specifying Engineer (Jun. 1997).

* cited by examiner

*Primary Examiner*—William Wayner
(74) *Attorney, Agent, or Firm*—Bryan Cave LLP

(57) ABSTRACT

A system and method for controlling the temperature and humidity level of a controlled space. The system includes a total energy recovery wheel and a dehumidification wheel in conjunction with a cooler to control the temperature and humidity of air supplied to a controlled space. In a method of controlling temperature and humidity of a controlled space, supply air is cooled and dehumidified by passing it through a rotating total energy recovery wheel. The total energy recovery wheel is cooled and dehumidified by passing exhaust air through it. The supply air is further cooled and dehumidified by passing it through a cooler. The supply air is warmed and further dehumidified by passing it through a rotating dehumidification wheel. The dehumidification wheel is warmed and dehumidified by passing exhaust air through it. During the heating mode, the system functions as an extremely effective total energy recovery device by operating the two wheels in series.

51 Claims, 8 Drawing Sheets

SYSTEM AND METHOD FOR CONTROLLING TEMPERATURE AND HUMIDITY

BACKGROUND OF THE INVENTION

1. Field of the Invention

The present invention pertains to the field of heating, ventilating, and air conditioning ("HVAC"). More particularly, this invention relates to systems and methods for controlling the temperature and humidity of a controlled space.

2. Background

The quality of indoor air has been linked to many illnesses and has been shown to have a direct impact on worker productivity. New research strongly suggests that indoor humidity levels have a far greater impact on the health of building occupants than previously suspected. For example, microbial activity (e.g., mold and fungus), which increases at higher indoor humidity levels, has been shown to emit harmful organic compounds. Childhood asthma is now suspected by some researchers to be linked to such microbial activity.

In addition to direct health effects, the odors associated with microbial activity are often cited as a primary reason why indoor air quality is considered unacceptable to occupants. When odors are encountered in a building, building operators often respond by increasing outdoor air quantities in an attempt to eliminate odors. This often exacerbates the problem because increasing outdoor air quantities often results in higher indoor air humidity levels, which, in turn, fosters further microbial activity.

The HVAC industry has responded to these indoor air quality ("IAQ") concerns through its trade organization, the American Society of Heating and Refrigeration and Air Conditioning Engineers ("ASHRAE"). Several years ago, the ASHRAE issued IAQ Standard 62-1989, entitled, "Ventilation for Acceptable Indoor Air Quality." This standard emphasizes the need for continuous outdoor air ventilation as well as the importance of maintaining indoor humidity levels. Recently proposed modifications to the standard (62-1989R) have placed further emphasis on humidity control, specifically in hot and humid climates. The proposed standard emphasizes the need for maintaining proper humidity levels during peak and partial loading conditions, and during both occupied conditions (where it is recommended that relative humidity be maintained at no more than 60%) and unoccupied conditions (where it is recommended that relative humidity be maintained at no more than 70%). There is, therefore, a significant need for energy-efficient systems that effectively control the humidity of an indoor space while simultaneously providing high quantities of outdoor air to the space.

Facilities with high occupancy rates or high levels of ingress and egress, such as schools, hospitals, nursing homes and many offices, typically have large amounts of outdoor air introduced to the occupied space and, consequently present a significant HVAC design challenge. Due to the extreme humidity levels and large number of partial-load cooling hours that exist in hot and humid climates, maintaining relative humidity at levels recommended by ASHRAE is extremely difficult and costly if conventional HVAC approaches are to be used for such facilities.

For example, during days when the temperature is moderate but the humidity is high (partial load conditions) a packaged HVAC unit will quickly bring the space to the desired temperature, then turn off its cooling coil. As the outdoor air continues to be provided to the space, the indoor humidity level climbs until the temperature in the space once again causes the thermostat to initiate cooling operation. By this time, the mixed air condition supplied to the cooling coil is elevated in humidity. The elevated humidity level of air reaching the cooling coil results in a high dew point temperature leaving the cooling coil. The space temperature is maintained but humidity control is lost, resulting in elevated space humidity conditions.

One of the most effective design solutions for controlling the temperature and humidity of a controlled space while providing high quantities of outdoor air involves decoupling the latent load from the conventional HVAC units serving the facility. This approach allows the conventional units to be downsized to handle the sensible load only. The dehumidified outdoor air is provided directly to the controlled space via a separate system at a room neutral temperature and humidity (typically 68° F. and 55 grains). This approach allows the desired quantity of outdoor air to be provided continuously while simultaneously maintaining a desirable and consistent relative humidity for the space.

Desiccant-based systems have been used to provide a continuous supply of dehumidified outdoor air. These systems can remove a significant amount of the humidity contained within the outdoor air prior to its introduction to the conventional HVAC system or, as mentioned previously, directly to the conditioned space. This allows the packaged equipment to operate as designed and to better control the space humidity despite increased outdoor air requirements.

Desiccants can be solid or liquid substances that have the ability to attract and hold relatively large quantities of water. In many commercial air conditioning applications where desiccants are used, the desiccant is in a solid form and absorbs moisture from the air to be conditioned. Examples of these types of desiccants are silica gel, activated alumina, molecular sieves, and deliquescent hygroscopic salts. In some cases, these desiccants are contained in beds over which the air to be conditioned is passed. Many times, however, the desiccant is contained in what is known as a "desiccant wheel."

A desiccant wheel is an apparatus typically comprising a plurality of closely spaced, very thin sheets of paper or metal which are coated or impregnated with a desiccant material. The wheel is frequently contained in duct work or in an air handling system that is divided into two sections. The wheel is rotated slowly on its axis such that a given zone of the wheel is sequentially exposed to the two sections. In the first section, the desiccant is contacted by the supply/outdoor air. In this section, the desiccant wheel dehumidifies the supply/outdoor air stream by absorbing moisture from the air onto its desiccant surface.

In the second section of the desiccant wheel, the desiccant contacts the return/exhaust air being discharged from the space. This return/exhaust air desorbs the moisture from the desiccant that was adsorbed from the supply/outdoor air. By cycling the wheel through these two air streams, the adsorbing/desorbing operation of the wheel is continuous and occurs simultaneously.

The prior art generally includes two types of desiccant-wheel systems: i) the "passive" dual wheel energy recovery preconditioner (DWERP) system; and ii) the "active" thermally regenerated desiccant-based cooling (DBC) system.

As shown in prior art FIGS. 1A and 1B, the DWERP system typically combines a desiccant-based total energy recovery wheel and sensible only recovery wheel along with a conventional chilled water or direct expansion ("DX") cooling coil to cool and dehumidify or heat and humidify the outdoor air supplied to a facility (depending on the ambient conditions).

A typical DWERP system operating in the cooling mode is illustrated in FIG. 1A. In the cooling mode, the supply/outdoor air stream passes through the desiccant-based total energy recovery wheel where it is precooled and dehumidified, giving up much of its humidity and heat to the desiccant coated wheel media. Next the outdoor air is passed through the cooling coil where it is further cooled and dehumidified until reaching the absolute humidity level required by the occupied space. The cold, dehumidified outdoor air stream is finally passed through a sensible only wheel where it is reheated to the desired temperature, using only the energy contained within the return air stream being exhausted from the space and passed through the secondary side of the sensible only wheel.

The return air stream leaves the sensible only wheel cool and dry, having passed through the transfer matrix cooled by the cold air leaving the cooling coil. This cool, dry air is then passed through the total energy recovery wheel where it picks up the heat and moisture contained within the desiccant coated total energy recovery matrix and exhausts it to the outdoors.

The cooling coil in the DWERP can typically be operated as low as 51° F. to deliver air at an absolute humidity level of 55 grains. With custom modifications, DX cooling coils can be designed in a DWERP system to cool the outdoor air as low as 48° F. to produce a delivered absolute humidity level as low as 50 grains, the practical limit for conventional cooling equipment. At an outdoor humidity condition of 130 grains (a typical dew point cooling design condition for the southern United States) the DWERP is usually capable of providing no more than an 80 grain reduction in the outdoor humidity content, resulting in a latent load reduction of approximately 544,000 BTU/hr for a 10,000 cfm system.

Referring now to prior art FIG. 2, the "active" desiccant-based cooling system (DBC) has also been applied to reduce latent loads. The "active" DBC system typically combines a thermally regenerated desiccant dehumidification wheel (an "active DH wheel"), a sensible only recovery wheel, a regeneration heat source and, in most cases, an evaporative cooler. FIG. 2 illustrates an example of a typical DBC system operating in a cooling mode. The DBC system operates by passing the outdoor/supply air through the thermally regenerated desiccant wheel, wherein the air is dehumidified and warmed. This warming occurs from both the heat of adsorption (energy released when the moisture is adsorbed on the desiccant surface) and the heat that is transferred by the dehumidification wheel matrix as it rotates from the hot regeneration air stream to the outdoor/supply air stream. Upon exiting the desiccant wheel, the hot outdoor/supply air is cooled by passing it through the sensible only wheel. At this point in a DBC system the outdoor/supply air condition is dehumidified, but at approximately the same temperature as the outdoor air. As a result, a significant amount of post cooling energy is required to reduce the supply air temperature to the desired space neutral condition.

The regeneration air stream of an active DBC system can be either a return air stream or another outdoor air stream. In either case, this air stream is usually first passed through an evaporative cooler to provide an improved driving force for the outdoor/supply air side sensible only heat recovery (in order to reduce the post cooling required). The air leaves the evaporative cooler cooled and humidified, then passes through the secondary side of the sensible only heat exchanger where the air stream is preheated prior to being introduced to the regeneration heater. Next, some or all of this air stream is passed through the regeneration heating source where it is typically heated to a temperature in the range of 175° F. to 300° F. This hot regeneration air stream desorbs the moisture contained in the active DH wheel's desiccant coating and exhausts it from the DBC system. The "active" DH desiccant wheel used in this DBC system must be continuously regenerated with a sizable thermal energy source in order for it to continuously dry the outdoor/supply air stream to the humidity level required by a typical application.

Even more than the DWERP approach, the active DBC system is limited in its ability to provide extremely dry air at typical dew point design conditions. The maximum moisture reduction currently available from a conventional DBC system is typically approximately 70 grains, and this level of humidity reduction generally requires the system to be operated at very low face velocities (i.e,. a very large system for the airflow processed). As a result, at an outdoor air dew point design condition of 130 grains, the delivered air condition from a DBC system will be limited to approximately 60 grains (10 grains higher than provided by the DWERP) and the temperature of the outdoor/supply air delivered to the space would usually be in excess of 80°–90° F.

A shortcoming of both the "passive" DWERP and the "active" DBC systems is that they cannot typically provide outdoor air drier than 50 grains and 60 grains respectively at the typical dew point design condition of 130 grains of moisture per pound of dry air. In many applications it is very desirable to provide air in the range of 35 to 45 grains so that the entire latent load can be decoupled from the conventional cooling system, allowing it to be downsized to handle only the sensible load of the building. Two application examples include schools and offices.

School facilities are often designed to trade off indoor air quality for reduced cost. For example, many school facilities recently constructed in the southern United States have been designed to provide an outdoor air volume of only 7.5 cfm/student, as opposed to the 15 cfm/student required by ASHRAE standards. Cutting the outdoor air volume in half reduces the initial cost of the facility because the size of the outdoor air preconditioning system is reduced accordingly, as is the size of the ductwork required to accommodate the outdoor and exhaust air streams. However, because the outdoor air volume is cut in half, the grain differential between that supplied to the space and that desired within the space must be doubled if all of the space latent load is to be handled by the outdoor air preconditioning system. To do so requires very dry air.

For example, a typical school classroom contains approximately 30 children. The sensible load associated with the lights, occupants and other things in the classroom is approximately 2 tons (24,000 BTU/hr.). The latent load associated with the occupants and infiltration is approximately 4.3 pounds per hour. Assuming the space is to be controlled at 75° F. and 50% relative humidity, an absolute humidity content of 65 grains is desired. If the latent load is to be handled with an outdoor air load of 450 cfm (based on 15 cfm/student), then the outdoor air must be delivered at 50 grains. This can be calculated by dividing the pounds of latent load by the pounds of dry air (4.3 lbs. moisture/hr divided by 2,025 lbs. outdoor air/hour) to determine the required moisture differential required (in this case a differential of 0.0021 lb. moisture per lb. of dry air is required or 15 grains). By taking the desired space humidity content (65 grains) and subtracting the calculated moisture differential (15 grains) the required supply condition may be calculated (50 grains).

If only 7.5 cfm/student is applied, in lieu of 15 cfm, then the required moisture differential doubles from 15 grains to 30 grains. As a result, to handle the latent load with 225 cfm of outdoor (7.5 cfm/student) the outdoor air must now be delivered at 35 grains (65 grains −30 grain moisture differential). As mentioned previously, this is much drier than can be provided with conventional DWERP or DBC systems.

A similar scenario exists in a typical office environment where the required 20 cfm per person comprises only approximately 20% outdoor air. For example, the office building may require 20,000 cfm of supply air of which 4,000 is outdoor air. If the outdoor air could be dehumidified to 40 grains by an outdoor air preconditioning system, then this air, when mixed with 16,000 cfm of return air at 65 grains would require the air entering the space to have an absolute humidity level of 60 grains to maintain the desired space relative humidity of 50% at 75° F. A significant benefit is achieved because the cooling coil can now be operated to provide air at only 58° F. to handle the sensible load as opposed to 52° F. that would have been required to deliver the 60 grain air if it had not been dehumidified by the outdoor air preconditioner. This increased dehumidification capability would have a very positive impact on the cost of the project, chiller efficiency and energy consumption, and would improved humidity control during unoccupied conditions.

Conventional DWERP and DBC dual wheel systems both lack the capability to efficiently provide very dry air (35 to 45 grains when processing outdoor air at typical dew point design conditions 120 to 130 grains) that is often necessary to control the space relative humidity below 60% as recommended by ASHRAE. Hence, there is a strong need for an improved outdoor air preconditioning system for controlling both the temperature and humidity of occupied and unoccupied spaces that is capable of delivering air at very low absolute humidity levels (below approximately 48 grains), in an energy efficient manner.

Another disadvantage of DBC active desiccant dual wheel systems is that they require an external heat source to regenerate the desiccant wheel to drive the dehumidification process. Such systems also typically apply an evaporative cooling section to help remove much of the heat generated by the desiccant wheel as part of the adsorption process. This heat of adsorption and carry-over heat from the desiccant wheel significantly raises the temperature of the outdoor air stream. The portion of the heat that is not removed by the second, sensible only wheel and evaporative cooling section must be removed using post-cooling energy from either in the DBC system or added to the HVAC systems serving the space. The requirement for regeneration heat adds complexity to the system's operation, installation and control sequence, and often requires a different heating source than that used for space heating because of the high temperature required to dehumidify humid outdoor air to the desired humidity level. The evaporative cooling section increases system maintenance, such as water treatment and winterization, and often increases microbial growth. Thus, there is also a strong need for an outdoor air preconditioning system that can deliver very dry air without the use of a regeneration heating source or an evaporative cooling section.

Another shortcoming of conventional DBC active desiccant dual wheel systems is limited flexibility. These systems can provide warm dry air. But, as the outdoor air humidity increases, the outlet temperature from the unit also increases. As a result, the DBC system cannot provide cool dry air (without significant post-process cooling) when the space conditions are hot and humid. Thus, it would be advantageous to provide a system that could provide dry, cool air when the space becomes hot and humid, thereby having the flexibility to handle various combinations of indoor and outdoor temperature and humidity conditions.

For the foregoing reasons there is a strong need for an energy efficient system for controlling the temperature and humidity level of the air of a controlled space that is capable of delivering preconditioned outdoor air at very low absolute humidity levels without requiring an external heat source and that has the flexibility to handle various combinations of temperature and humidity. The present invention provides these and other advantageous results.

SUMMARY OF THE INVENTION

A system and method for controlling temperature and humidity of a controlled space is described herein. The system preferably comprises an air supplier (e.g., a fan) and an air exhauster (e.g., another fan) for creating supply and exhaust air streams, which are separated by a partition. The system further comprises a total energy recovery device and a dehumidification wheel, each of which is positioned to contact the supply air stream and the exhaust air stream, exchanging heat and moisture between the supply and exhaust air streams. The system further comprises a cooler (e.g., a cooling coil) in the supply air stream between the total energy recovery device and the dehumidification wheel, for cooling and dehumidifying the supply air stream. In one embodiment of the invention, the total energy recovery device is preferably a desiccant-based total energy recovery wheel. In another embodiment, the dehumidification wheel is preferably a desiccant-based dehumidification wheel.

The system of the present invention preferably has a cooling/dehumidification mode of operation. In this mode, the supply air stream is cooled and dehumidified by passing it through a dry and cool zone of the total energy recovery device. The supply air stream is then further cooled and dehumidified by passing it through the cooling coil. Before it is supplied to the controlled space, the supply air is reheated and further dehumidified by passing it through a warm and dry zone of the dehumidification wheel.

According to one aspect of the invention, the system further comprises a speed controller for adjusting the rotational speed of the dehumidification wheel, and/or a cooling control for adjusting the cooling output of the cooler. The speed controller may be adjusted so as to control the level of heat and moisture exchanged by the dehumidification wheel. The cooling controller may be adjusted so as to control the level of cooling and dehumidification provided by the cooler. These controllers may be adjusted and coordinated so as to provide various combinations of temperature and humidity control.

In accordance with one embodiment of a method of the invention, the controlled space is cooled without substantially adjusting the space humidity by increasing the cooling output of the cooler and adjusting the rotational speed of the dehumidification wheel to a predetermined range within which the dehumidification wheel provides an desired level of cooling.

In accordance with another method of the invention, the controlled space is cooled and dehumidified by increasing the cooling output of the cooler and adjusting the rotational speed of the dehumidification wheel to a predetermined range within which the dehumidification wheel provides a reduced level of heating.

In accordance with another embodiment of the method of the invention, the controlled space is cooled and dehumidified by increasing the cooling output of the cooler and adjusting the rotational speed of the dehumidification wheel to a predetermined range within which the dehumidification wheel provides a desired level of heating and dehumidification.

In accordance with another embodiment of the method of the present invention, the controlled space is heated without substantially adjusting the space humidity by reducing the output of the cooler such that delivered humidity content of the air entering the controlled space approximates that desired within the controlled space, and increasing the rotational speed of the dehumidification wheel to a predetermined range within which the dehumidification wheel provides an elevated level of heating.

In another method the controlled space is heated and dehumidified by increasing the cooling output of the cooler such that the cooler dehumidifies the supply air entering the dehumidification wheel and adjusting the rotational speed of the dehumidification wheel to a predetermined range within which the dehumidification wheel provides a desired level of heating and dehumidification.

The present invention also encompasses a method of controlling temperature and humidity of a controlled space comprising the following principal steps: air is first supplied to and exhausted from the controlled space; the supply air steam is then cooled and dehumidified by passing it through a dry and cool zone of a total energy recovery device; the supply air stream is then further cooled and dehumidified by passing it through a cooling coil; and before it is supplied to the controlled space, the supply air is warmed and further dehumidified by passing it through a warm and dry zone of a dehumidification wheel.

DRAWINGS

These, and other features, aspects and advantages of the present invention will become more fully apparent from the following detailed description, appended claims, and accompanying drawings where:

Figure 1A:
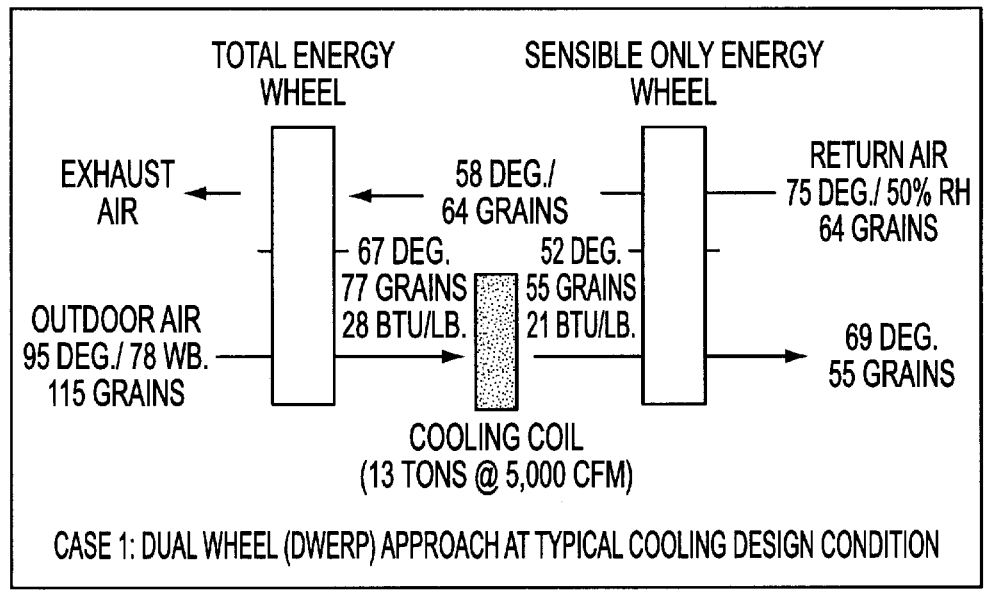
FIGS. 1A and 1B are schematics showing examples of the typical performance of a prior art dual wheel energy recovery preconditioner system (DWERP) at typical design conditions during the cooling season and heating season, respectively.
Figure 1B:
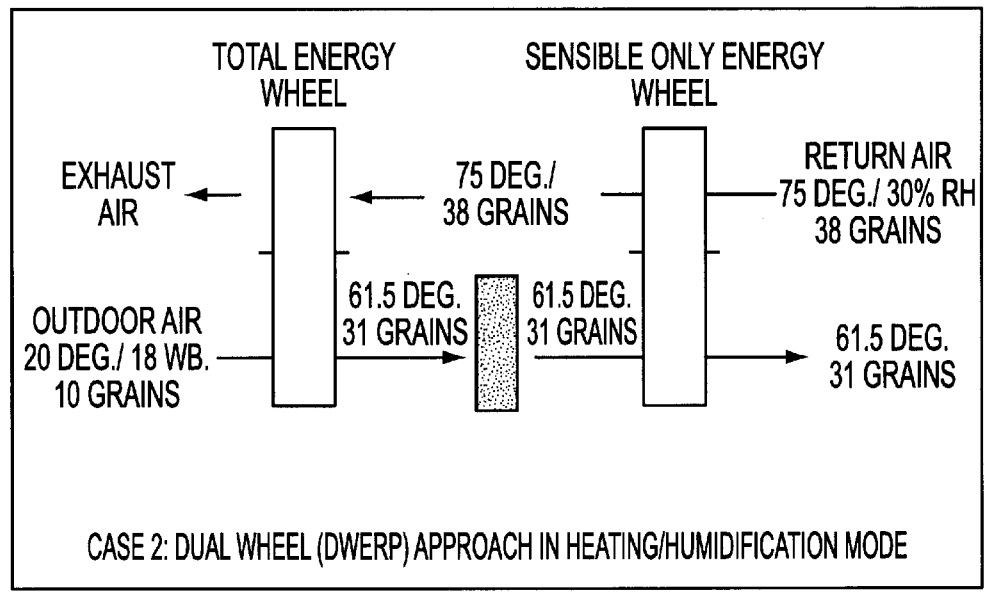
Figure 2:
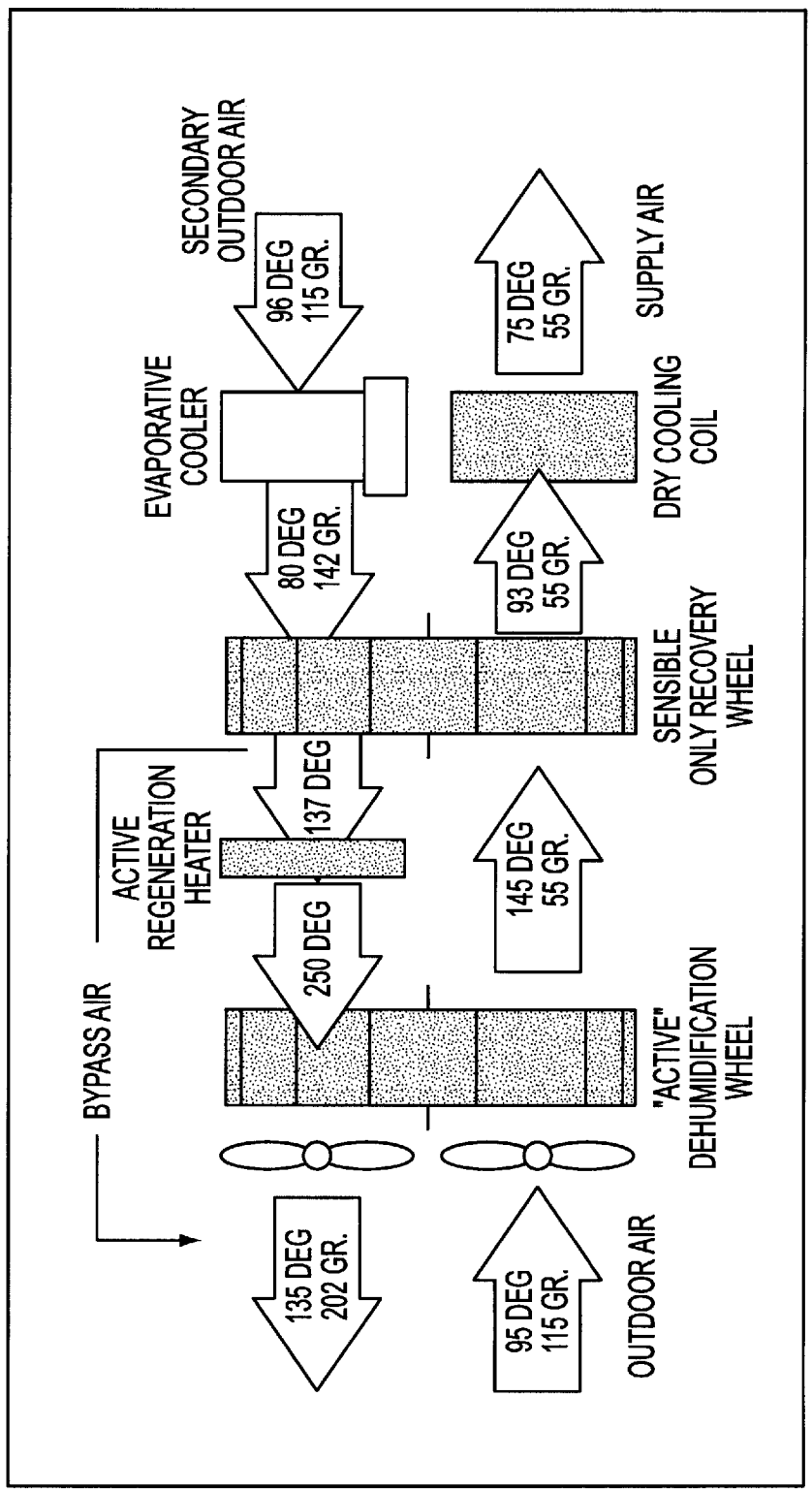
FIG. 2 is a schematic showing an example of the typical performance of a prior art active desiccant-based cooling system (DBC) at typical design conditions during the cooling season.
Figure 3A:
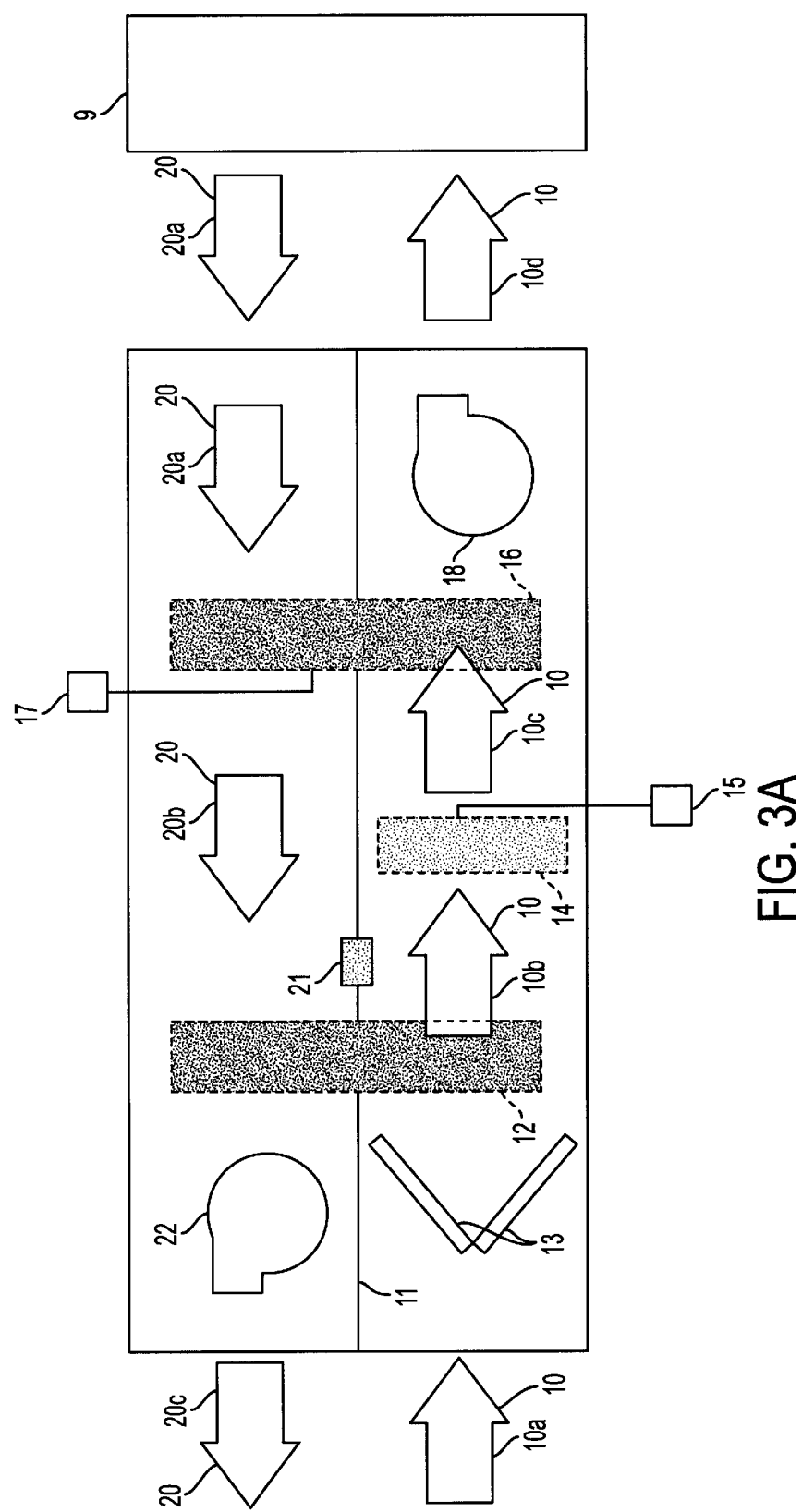
FIG. 3A is a schematic showing an embodiment of the system of the present invention.
Figure 3B:
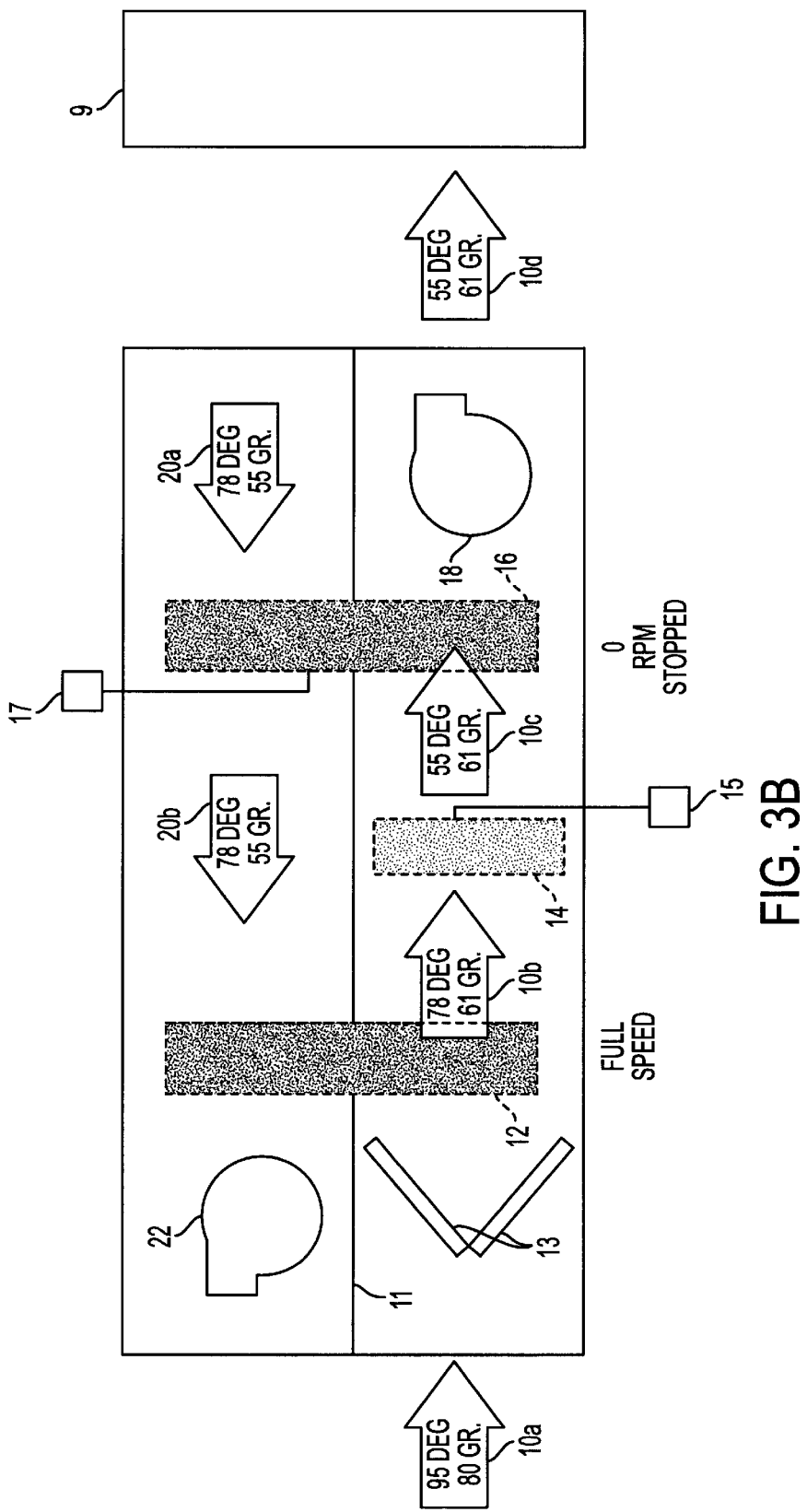
FIG. 3B is a schematic showing an example of a method of using the system of FIG. 3A to control temperature and humidity levels when the controlled space is too hot and the humidity level is acceptable or too dry.
Figure 3C:
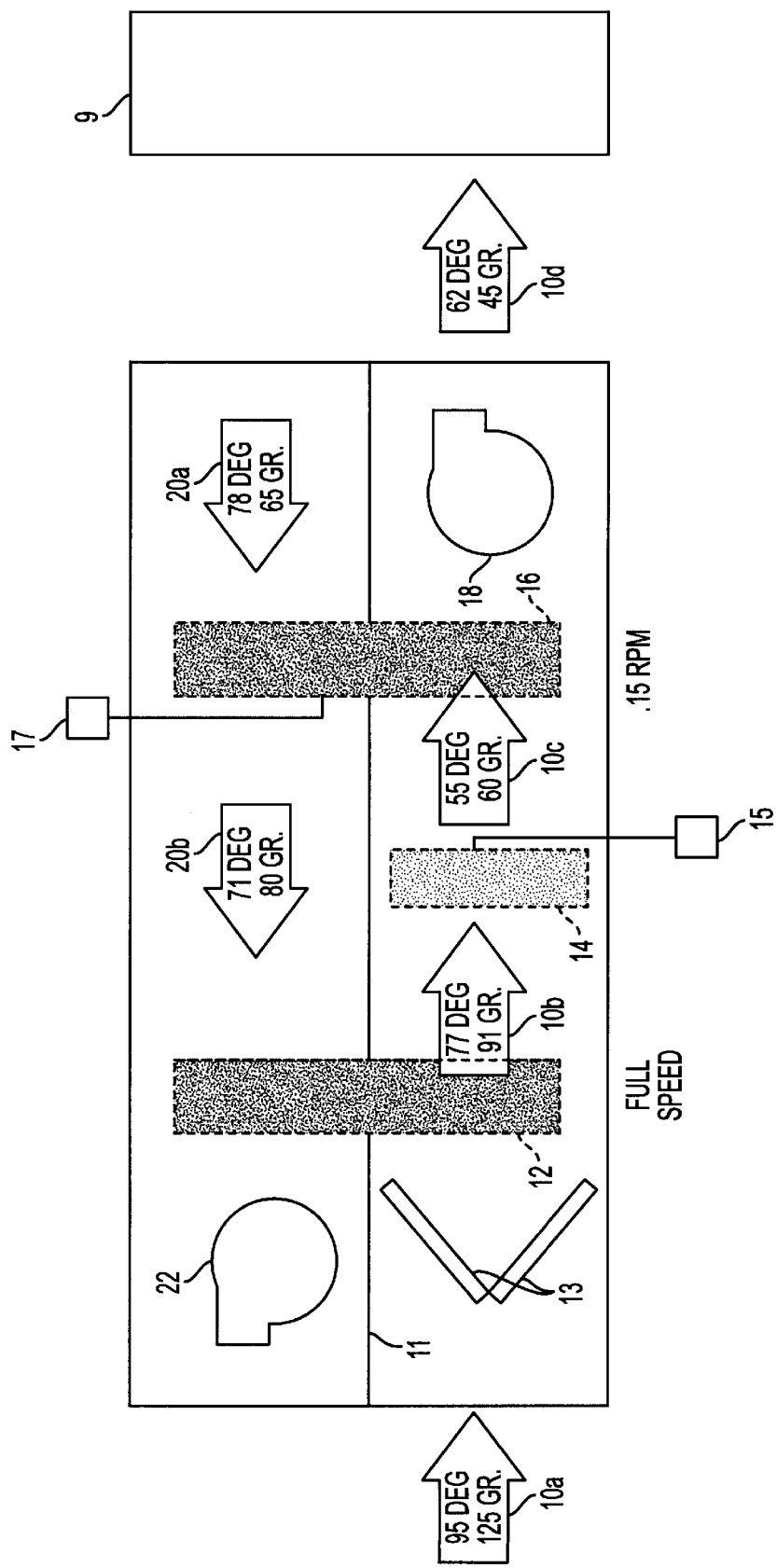
FIG. 3C is a schematic showing an example of a method of using the system of FIG. 3A to control temperature and humidity levels when the controlled space is too hot and too humid.
Figure 3D:
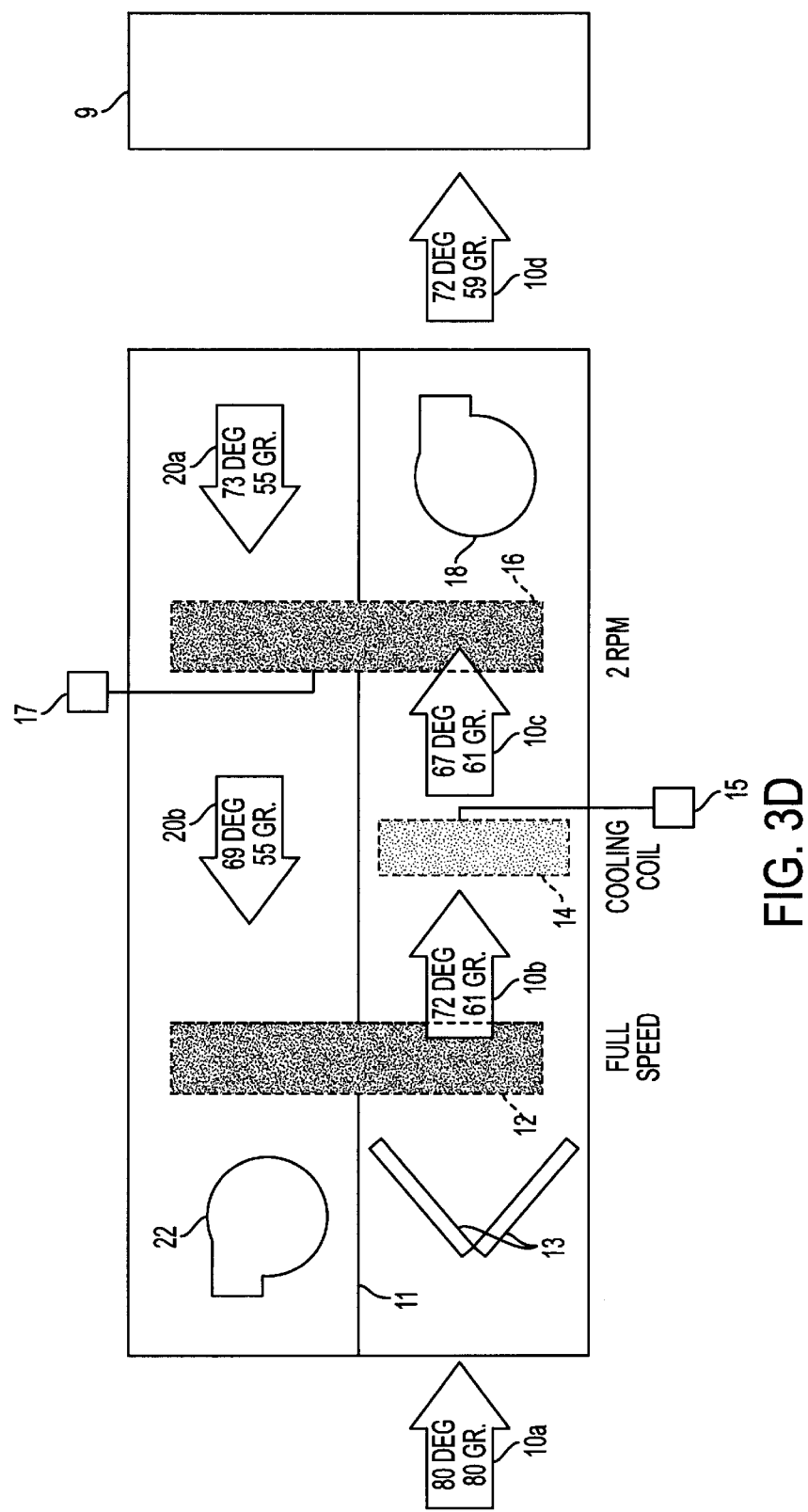
FIG. 3D is a schematic showing an example of a method of using the system of FIG. 3A to control temperature and humidity levels when the controlled space is too cold and too dry.
Figure 3E:
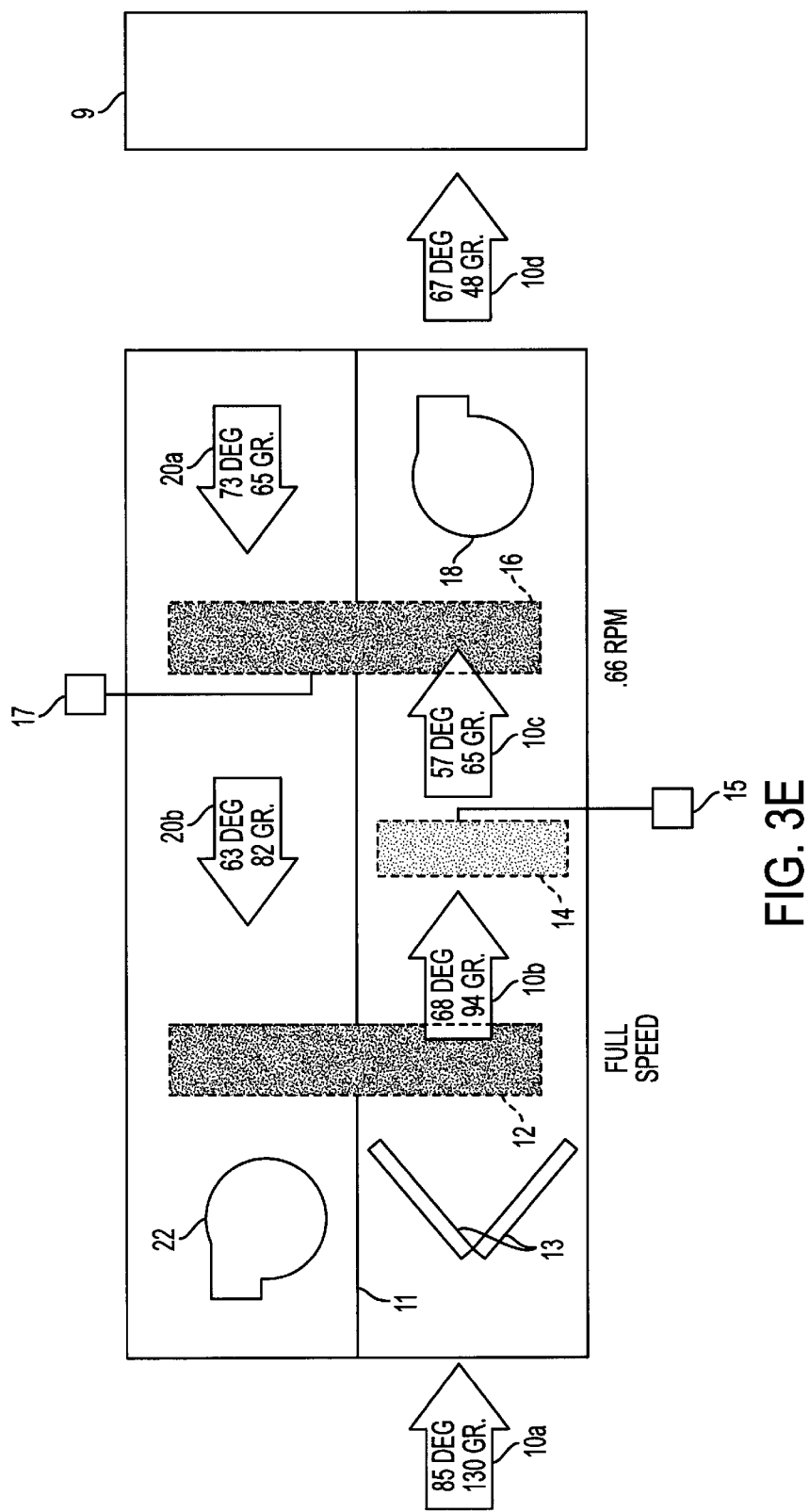
Figure 4:
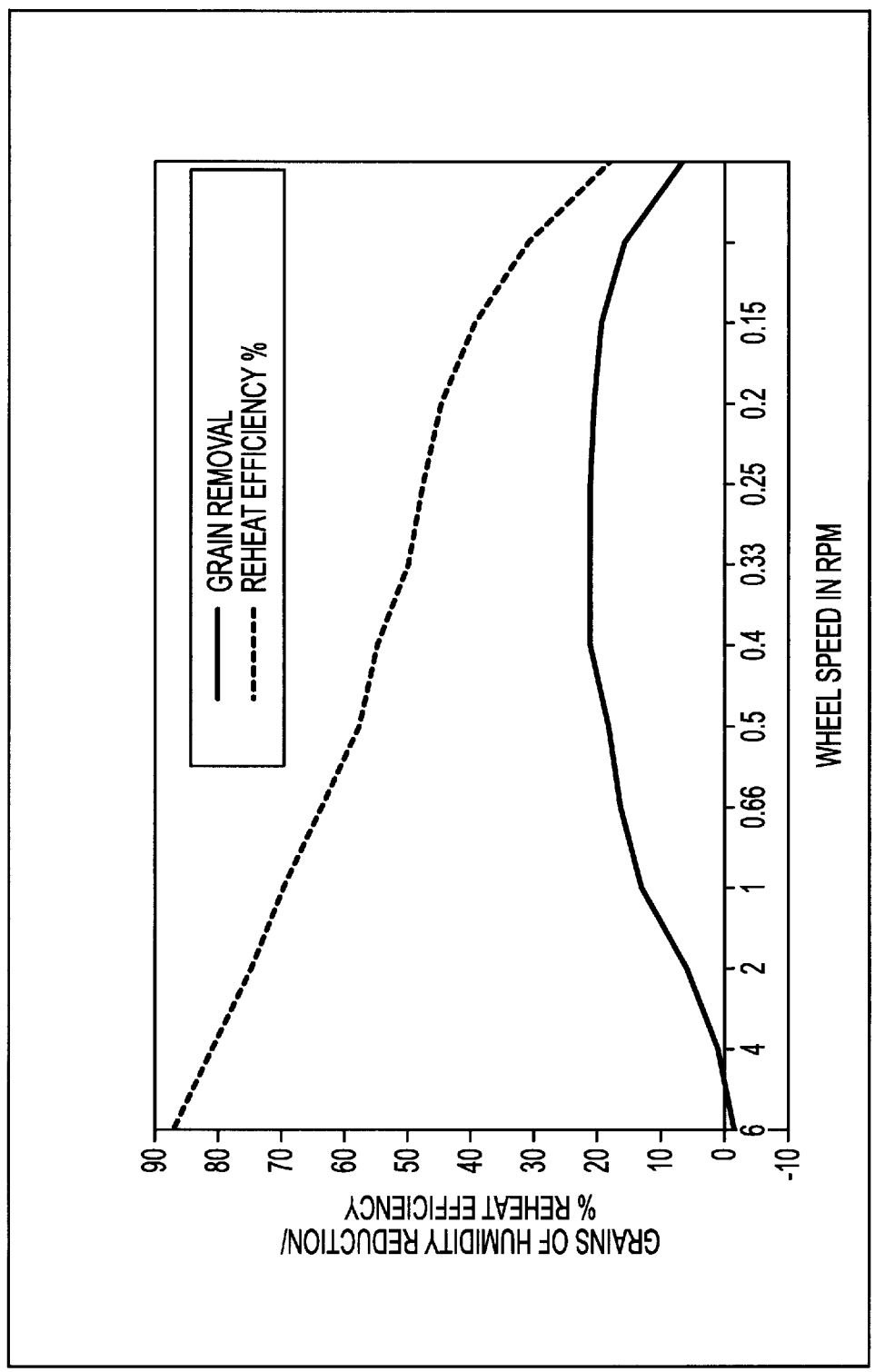

FIG. 3E is a schematic showing an example of a method of using the system of FIG. 3A to control temperature and humidity levels when the controlled space is too cold and too humid; and FIG. 4 is a graph showing the level of humidity reduction in grains and the level of temperature rise in terms of the percent of reheat efficiency for the supply air versus rotational speed of the dehumidification wheel of an embodiment of the present invention, where reheat efficiency is defined as the temperature rise in degrees across the supply side of the latent wheel (FIGS. 3A, 10a–10c) divided by the difference in temperature between the air leaving the cooling coil and the exhaust air leaving the space (FIG. 3A, 20a–10c).

DETAILED DESCRIPTION OF THE INVENTION

As shown in FIG. 3A, an embodiment of the system of the present invention preferably comprises the principle elements of an air supplier 18 adapted to supply air to a controlled space "9" creating a supply air stream 10; an air exhauster 22 adapted to exhaust air out of the controlled space "9" creating an exhaust air stream 20 adjacent to the supply air stream 10; a partition 11 disposed between the supply and exhaust air streams, which separates the supply and exhaust air streams; a total energy recovery device 12 in contact with the partitioned supply air stream 10 and the exhaust air stream 20, that exchanges heat and moisture between the supply and exhaust air streams; a dehumidification wheel 16 positioned to rotate through the supply air stream 10 and the exhaust air stream 20, that exchanges heat and moisture between the supply and exhaust air streams; a cooler 14 disposed in the supply air stream 10 between the total energy recovery device 12 and the dehumidification wheel 16, adapted to cool and dehumidify the supply air stream 10.

The air supplier 18 and the air exhauster 22 may preferably be any means capable of moving air so as to create an air stream, for example, a fan or a blower. Either the air supplier 18 or the air exhauster 22 or both may be located either within the system itself or external to the system. For example, either component may be connected to the system by ductwork.

The supply air stream 10 is any stream of air from any source that is supplied to the system. For example, in a preferred embodiment the supply air stream comprises outside air (i.e., any air drawn from outside of the controlled space "9" including air drawn from another enclosed space). Outside air may preferably include, for example, outdoor air (i.e., air drawn from outside of a facility). In another preferred embodiment, the supply air stream 10 comprises recirculated air, drawn from the controlled space "9". In yet another preferred embodiment, the supply air stream 10 comprises a mixture of outside and recirculated air.

The exhaust air stream 20 preferably comprises air drawn from the controlled space "9". The exhaust air stream 20 may, however, comprise air from a variety of other sources. For example, the exhaust air stream 20 may comprise air drawn from outside the controlled space "9" or a mixture of air drawn from inside and outside the controlled space "9". Those skilled in the art will recognize that supply air at 20a is often referred to as "return air." The term "exhaust air stream" used herein is intended to be construed broadly to include "return air."

The supply air stream 10 and the exhaust air stream 20 are separated by a partition 11. For example, this partition may comprise separate ducts for the supply and exhaust air streams or a baffle between the two air streams. The exhaust air stream 20 is adjacent to the supply air stream 10. However, the term "adjacent" should be construed broadly to encompass any of various configuration that would allow the total energy recovery device 12 and the dehumidification wheel 16 to be positioned to contact both the supply and exhaust air streams.

The controlled space "9" may be any space in which temperature and humidity control is desired. Typically, the controlled space "9" is an enclosed structure, for example, the interior of a school, nursing home, hospital or office building. The controlled space "9" is preferably enclosed, but need not necessarily be fully enclosed.

The total energy recovery device 12 may preferably comprise any device that removes sensible energy (temperature) and latent energy (moisture) from one air stream and transfers this sensible and latent energy to another air stream. For example, in a preferred embodiment, the total energy recovery device 12 comprises a total energy recovery wheel as described in Fischer, Jr. U.S. Pat. No. 4,769,053 (assigned to SEMCO Manufacturing, Inc.), which is incorporated herein by reference in its entirety for all purposes. In another embodiment, the total energy recovery device 12 described herein is a stationary total energy recovery device. For example, the total energy recovery device 12 may be a plate-type total energy recovery device made from an impregnated paper core material used to transfer sensible and latent energy from one air stream to another as described in Yano et al. U.S. Pat. No. 4,582,129, which is incorporated herein by reference in its entirety for all purposes, and Okamoto et al. U.S. Pat. No. 4,484,938, which is also incorporated herein by reference in its entirety for all purposes. Of course, the total energy recovery device 12 may be of various other constructions all of which are known to those skilled in the art.

In another embodiment, the total energy recovery device 12 may be replaced with a sensible energy recovery device (not shown). The sensible energy recovery device preferably transfers sensible energy, without transferring a substantial amount of latent energy. The sensible energy recovery device may comprise, for example, a coil-to-coil device, a heat pipe, a non-desiccant coated sensible only recovery wheel or a plate-to-plate heat exchanger. Very low humidity levels can still be achieved with a sensible energy recover device, but the required capacity of the cooler will usually be significantly greater.

The preferred total energy recovery wheel preferably rotates at about 20 revolutions per minute, but may be rotated at varying speeds depending upon the temperature and humidity adjustment desired for the particular application and the characteristics of the wheel media including desiccant type, desiccant loading, depth of the wheel, size of the flutes used to produce the media and the velocity of the air across the wheel. For example, a total energy recovery wheel made of paper and impregnated with a deliquescent desiccant such as lithium chloride (which has the capability of holding up to several times its own weight in water) can be rotated as slow as 8 revolutions per minute while still providing near equal sensible and latent recovery effectiveness. On the other hand, a total energy recovery wheel made from aluminum which has been treated to form an oxidized surface may, for example, need to be rotated at 30 revolutions per minute in order to recognize near equal sensible and latent recovery performance, even at low face velocities.

The total energy recovery wheel is commonly a thin substrate (e.g., a 1.3 to 2-mil thick aluminum foil) coated on both sides with a particulate desiccant in a binder matrix (typical coating thickness of about 1 mil on each side). Total energy recovery wheels can also be made from other metal foils, polymer films or paper substrates, coated or impregnated with solid adsorbents or deliquescent absorbents. Because a primary function of the total energy recovery wheel is to transfer both temperature and moisture at the highest possible effectiveness, because the desiccant readily picks up moisture and has a relatively low heat capacity, and because the substrate readily picks up heat but little or no moisture, the mass of desiccant on such a wheel can be relatively low (about 15%–30% of the total wheel mass) and the mass of the substrate can be relatively high (about 70%–85% of the total wheel mass). Additionally, the speed at which the wheel is rotated and the mass of the wheel is preferably high relative to the mass of the airflow being processed to increase the rate at which heat and mass can be transferred from one air stream to the other air stream. For example, because most total energy recovery wheels currently produced and marketed are made from adsorbent coated aluminum or polymer substrates, and because most applications operate these wheels at a high face velocity in order to minimize the size of the equipment as well as the cost of the project, the wheels typically may be rotated between 20 and 25 revolutions per minute at full recovery conditions in order to optimize both sensible and latent performance.

The dehumidification wheel 16 may comprise any one of various devices that removes latent energy (moisture) from one air stream and transfers this latent energy to another air stream. In a preferred embodiment the dehumidification wheel 16 is a rotary, desiccant coated, aluminum dehumidification wheel. The preferred desiccant-based dehumidification wheel utilizes a desiccant coating optimized to provide the maximum amount of dehumidification when operated under the novel operating conditions referenced herein. In one preferred embodiment, the dehumidification wheel is a passive desiccant-based wheel that does not require any additional high temperature regeneration energy in order to regenerate the wheel. The desiccant coating should preferably adsorb or absorb moisture very effectively from a cool, saturated air stream, then readily desorb the adsorbed moisture when the wheel media is rotated through the return air stream, typical of that being exhausted from most humidity controlled spaces, without the need for any additional high temperature regeneration energy typical of conventional desiccant-based dehumidification applications using active desiccant dehumidification wheels. However, those skilled in the art will appreciate that many traditional desiccant-based dehumidification wheels will provide some benefit when applied in the novel fashion described herein, the resulting effectiveness depending upon the operating properties (isotherm) of the desiccant utilized, the desiccant loading, the non-desiccant mass of the wheel and other physical parameters. Therefore, the claims of this invention should not be limited to a particular type of dehumidification wheel.

Because the dehumidification wheel is preferably used primarily for dehumidification and not for total energy recovery, it typically has relatively less substrate mass (30%–50%) and relatively more desiccant mass (50%–70%). A desiccant used for such a wheel desirably has as high a water adsorption capacity as possible and therefore as much useable desiccant mass on the wheel as is consistent with technical and economic constraints (desirably, coating thickness of more than one mil). Furthermore, although non-desiccant mass is required to carry and support the desiccant material, the wheel preferably has as little non-desiccant mass as possible because such mass reduces the wheel's dehumidification efficiency.

Desiccant materials used for embodiments employing desiccant-based dehumidification wheels may include, for example, A-type, X-type or Y-type molecular sieves and other zeolites, activated alumina, lithium chloride and other deliquescent salts, hydrophobic polymers or other materials capable of adsorbing or absorbing water vapor from an air stream. In a preferred embodiment, a desiccant material that is capable of adsorbing/absorbing and desorbing a significant amount of water vapor when cycled between conditions of approximately 95% relative humidity and 45% relative humidity is utilized. Desiccant materials that have moisture isotherms that meet this criteria include most silica gel desiccants and specifically large pore, low density silica gel powders that are capable of adsorbing a very high percentage of their own weight when subjected to very high humidity environments.

As explained in greater detail later, the rotational speed of the dehumidification wheel may be adjusted according to the amount of dehumidification and reheat efficiency sought. For example, in a preferred embodiment, the speed of the desiccant-based dehumidification wheel varies from a minimum of 0 to a maximum of 6 rotations per minute.

The cooler 14 is preferably disposed in the supply air stream 10 between the total energy recovery device 12 and the dehumidification wheel 16. The cooler 14 is preferably adapted to cool and dehumidify the supply air stream 10. The cooler 14 preferably comprises chilled water or direct expansion cooling coils. As explained in greater detail below, in one embodiment the cooler further comprises a controller "15" for adjusting the level of cooling and dehumidification provided by the cooler 14.

The system and method of the present invention preferably uses a desiccant-based total energy recovery wheel and a second desiccant-based dehumidification wheel in conjunction with a conventional chilled water or direct expansion coil to cool and/or dehumidify air supplied to a controlled space.

In an embodiment of the cooling/dehumidification mode, the total energy recovery device 12 (e.g., a desiccant-based total energy recovery wheel) preferably precools and dehumidifies supply air 10a using the relatively cool, dry exhaust air 20b leaving the exhaust side of the dehumidification wheel 16 (e.g., a passive desiccant-based dehumidification wheel). Next, a cooler 14 (e.g., chilled water or direct expansion cooling coils) preferably delivers cool, further dehumidified supply air 10c to the dehumidification wheel 16. Finally, the dehumidification wheel 16 preferably further dehumidifies and reheats the cool, saturated supply air 10c leaving the cooler 14. This preferably results in very dry (e.g., 35–45 grain) supply air 10d being delivered to the controlled space "9" at a neutral temperature (e.g., 68° F.). These low humidity levels are generally not available using conventional mechanical cooling based systems.

The dehumidification wheel 16 preferably utilizes the relatively warm and dry exhaust air 20a from the controlled space "9" to warm and dry the secondary side of the dehumidification wheel 16. This exhaust air 20b preferably leaves the dehumidification wheel 16 cooled and humidified.

Because the temperature and humidity level of the exhaust air 20b leaving the dehumidification wheel 16 typically remains significantly cooler and drier than the supply air stream 10a entering the system, the exhaust air 20b leaving the dehumidification wheel 16 preferably provides a significant driving force for total energy recovery.

The dew point of the air leaving the cooler 14 preferably does not limit the level of dehumidification provided by the system of the present invention, because the air is preferably further dehumidified as it passes through the dehumidification wheel 16, which improves operating efficiency and increases dehumidification capacity by delivering air that is drier than could be provided by the conventional cooling methods. As a result, the mechanical cooling capacity (the amount of energy required for cooling, the cooling tonnage, kilowatt input, gallons of chilled water, BTUs, etc., required to reach the desired leaving coil condition) can preferably be optimized and controlled to allow the system to provide extremely dry air to handle the peak latent design conditions in the controlled space, then operated at reduced input capacity to minimize energy consumption and to provide more moderate humidity levels to the dehumidification wheel which then drops the dew point of the supply air to the level required during times when the controlled space latent load is less extreme.

A typical school facility provides a good example of when these conditions are encountered. Early in the morning during the spring or summer seasons, the outdoor air temperature is mild but the humidity content is very high (typical latent design condition such as 80° F. and 130 grains of moisture). When the school buses arrive and the students open the doors for extended periods while entering the facility, a very high humidity spike can exist within the building. In this case, the system described herein would preferably operate at its maximum dehumidification capacity to provide the lowest possible dew point off of the coil and optimize the speed of the dehumidification wheel to maximize the amount of post-dehumidification provided. This preferably provides the driest possible air to the space until the desired humidity conditions are maintained, at which time the system begins to reduce the cooling coil input to optimize energy input and cost, while maintaining the desired space temperature and humidity conditions.

In contrast, after the students leave the school facility, the latent load generated within the space is generally insignificant. Because the system described is preferably designed to keep the space under a slight positive pressure to minimize infiltration, and because the doors to the facility are consistently closed, the moisture added to the space via infiltration is also very small. As a result, under these conditions, the humidity content of the air delivered to the space can be significantly higher (less dry) than in the previous "high internal latent load" example, while controlling the space at the same humidity level. In this case the cooling energy input to the system is reduced further, preferably allowing the dehumidification wheel to provide as much as possible of the post-dehumidification necessary to maintain the desired space conditions.

In a heating mode, both the total energy recovery device 12 and dehumidification wheel 16 can preferably be operated to recover more than 90% of the energy (temperature and humidity) required to heat and humidify the supply air stream 10 to the condition of the exhaust air stream 20 leaving the facility. In most cases, this level of recovery allows the controlled spaces to be self heating, even on very cold days, once normal lighting and people loads are introduced to the controlled space. The significant advantage that this approach provides over the current DWERP dual wheel approach is that because both devices are dehumidifying the exhaust air stream as it is being cooled (to allow the supply air to be heated) the risk of frosting of the total energy recovery device is significantly reduced, thereby allowing for the 90% plus recovery level possible by operating the two devices in series to be utilized. The risk of frost formation in the DWERP approach usually requires the second sensible wheel to be cycled off, limiting the heating season total recovery level to approximately 75% in a typical application.

FIG. 4 shows an example of the novel performance characteristics provided by a passive desiccant-based dehumidification wheel as used in an embodiment of the system and method of the present invention. As the rotational speed is varied from 0 to 6 rpm, the wheel is able to provide differing degrees of reheat and/or dehumidification. FIG. 4 summarizes actual test data for a passive desiccant dehumidification wheel designed specifically for the system described by this invention, and as previously described herein. In a test facility constructed in accordance with ASHRAE 84-1991 requirements, the dehumidification wheel was installed in a test cell that allowed for two air streams, (supply and return) to be passed counter currently through the wheel media as it was rotated at different operating speeds through the use of a variable frequency drive, turning a drive motor which in turn moved a belt placed around the perimeter of the desiccant wheel. The air streams were passed through the wheel media at a face velocity of approximately 600 feet/minute to simulate a typical operating condition for the system of this invention. The entering supply air stream was carefully controlled at 55° F. and at a humidity level of 64 grains and the entering return air stream was carefully controlled at 79° F. and 55 grains, to reflect conditions likely to be encountered in a typical application of the invention. The supply air leaving the dehumidification wheel was measured for temperature and humidity content, as were the other four air streams, using instrumentation meeting the accuracy requirements set by the ASHRAE 78-1991 standard.

The supply air outlet data leaving the dehumidification wheel is summarized in FIG. 4 with two curves. One curve shows the dehumidification observed, shown as grains of moisture removed from the supply air inlet condition. A second curve in FIG. 4 shows the amount of reheat provided to the supply air outlet expressed in terms of reheat efficiency. For the purpose of this chart, using the air streams as labeled in FIG. 3A, reheat efficiency can be defined as: (Temp. at 10*d*—Temp. at 10*c*)/(Temp. at 20*a*—Temp. at 10*c*).

As is described below in detail, one of the many advantages of the system and method of the present invention is its flexibility, allowing it to effectively handle a wide range of humidity and temperature conditions. For example, as illustrated in FIG. 4, if the dehumidification wheel is rotated at approximately 5 rpm, the dehumidification is eliminated and the reheat capability is maximized in that the supply air stream leaving the cooler (10*d* of FIG. 3A) is reheated to approximately 85% of the temperature differential between the air stream leaving the cooler (10*c* of FIG. 3A) and the air stream entering the return side of the system (20*a* of FIG. 3A). At this wheel speed a supply air stream leaving the cooler at 55° F. would be warmed to approximately 75.4° F. using the energy contained in the 79° F. return air stream entering the system. This manner of operation preferably allows the system to perform precisely the same as a conventional dual wheel system (DWERP) described previously. However, decreasing the wheel speed from 5 rpm to approximately 0.5 rpm provides for approximately an additional 18 grains (or approximately 9° F. of dew point) of dehumidification at typical conditions while still providing a significant amount of free reheat, heating the 55° F. air to approximately 69° F. using the energy contained in the 79° F. return air stream mentioned previously. This operational mode is preferred when it is necessary to control humidity during times when internal latent loads are extreme or when outdoor airflow volumes are small relative to recirculated air volumes, and it is desired to handle all of the latent load (outdoor air and space) by over drying the outdoor air stream, during times when the internal sensible load is low (i.e., additional space cooling is not required).

When it is necessary to control humidity during times when internal latent loads are extreme or when outdoor airflow volumes are small relative to recirculated air volumes, and it is desired to handle all of the latent load (outdoor air and space) by over drying the outdoor air stream, during times when the internal sensible load is high (i.e., some additional space cooling is desired), the wheel speed is preferably operated at approximately 0.15 rpm. At this condition, approximately 20 grains of moisture are removed from the supply air stream already dehumidified by the total energy recovery device and cooler, but the amount of reheat energy applied to the supply air stream leaving the system is significantly reduced, heating the 55° F. air to only approximately 63.5° F. using the energy contained in the 79° F. return air stream mentioned previously.

If the space sensible load is very high (additional cooling is required) and if the latent load is nearly or totally satisfied, the dehumidification wheel speed can preferably be adjusted below 0.1 rpm (to minimize the reheating while still providing a small amount of additional dehumidification) or stopped (to provide air to the space at the temperature leaving the cooler, which in this example is 55° F.).

One of the many advantages of the system of the present invention when compared to the conventional dual wheel systems and other, more traditional over-cooling and reheat systems is that the dehumidification or latent capacity (e.g., dryness of the air provided to the controlled space) is preferably significantly increased. For example, the absolute humidity content the supply air provided to the controlled space by a DBC system processing outdoor air on a latent design day (85° F. and 130 grains) is generally limited to approximately 60 grains with technology currently available. To reach this condition typically requires equipment to be operated at very low face velocities (resulting in very large system space requirements) and regenerated at very high regeneration temperatures.

The DWERP and other conventional over-cooling reheat systems are limited by the dew point of the air leaving the cooling coil. Because most conventional cooling systems have a practical limit of approximately 48° F. to 50° F. for a leaving air temperature (the temperature of the air leaving the cooling coil), the absolute humidity level obtainable from most conventional systems is approximately 48 to 52 grains. Heretofore, attempting to reduce absolute humidity levels by reducing leaving air temperatures below approximately 48° F. would require expensive, non-standard cooling equipment with very deep cooling coils, complex controls with defrost cycles and significantly elevated kilowatt/ton energy consumption.

The system of the present invention can easily provide outdoor air at a humidity content of 40 grains with standard cooling equipment that results in a 90 grain reduction at the typical latent design condition of 130 grains (standard condensing units and shallow cooling coils), and can preferably be designed and operated to provide air as dry as 35 grains.

The present invention's ability to provide very dry air using conventional cooling equipment has many advantages, for example, reduction of energy costs. With very dry air, lower air flow quantities can handle far more latent load. For example, an office building could reduce energy consumption by operating its variable air volume ("VAV") air handling systems serving the space with dry cooling coils allowing the supply air leaving temperature to be set by the controlled space sensible loads. This is possible if the outdoor air volume provided to the VAV air handling system is dehumidified enough to handle the outdoor air and space latent loads. Because the percentage of outdoor air compared to the total supply air volume of a typical office designed to comply with ASHRAE 62–89 may only be 15%–20%, the outdoor air would need to be very dry if all of the internal latent load is to be handled by the outdoor air volume (dry cooling coils).

The system and method of the present invention would also be particularly well suited for school classrooms where designers attempt to reduce project first cost by designing for only 7.5 cfm/student in lieu of the recommended 15 cfm/student.

For example, a typical school classroom contains approximately 30 children. The sensible load associated with the lights, occupants, and other loads is approximately 2 tons. The latent load associated with the occupants and infiltration is approximately 4.3 pounds per hour. Assuming the space is to be controlled at 75° F. and 50% relative humidity, an absolute humidity content of 65 grains is desired. If the latent load is to be handled with an outdoor air load of 450 cfm (based on 15 cfm/student) then the outdoor air must be delivered at 50 grains. This can be calculated by dividing the pounds of latent load by the pounds of dry air (4.3 lbs. moisture/hr divided by 2,025 lbs. outdoor air/hour) to determine the required moisture differential required (in this case a differential of 0.0021 lb. moisture per lb. of dry air is required or 15 grains). By taking the desired space humidity content (65 grains) and subtracting the calculated moisture differential (15 grains) the required supply condition is calculated (50 grains).

If only 7.5 cfm/student is applied in lieu of the 15 cfm considered previously, then the required moisture differential doubles from the 15 grains previously calculated to 30 grains. As a result, to handle the latent load with 225 cfm of outdoor (7.5 cfm/student) the outdoor air must now be delivered at 35 grains (65 grains–30 grain moisture differential). Because this level of dehumidification is generally not obtainable with conventional HVAC equipment, this advantage of the system of the present invention is apparent.

The ability of the system of the present invention to provide very dry outdoor air is also particularly advantageous where extreme indoor air humidity loads are encountered. For example, at least two times a day the doors to a school facility may be kept open for extended periods of time. Doors are frequently open in the morning when the students arrive and also when they leave for the day. It is very desirable to have excess/reserved latent capacity in the HVAC system in order to bring the indoor conditions back under control. This reserve capacity is particularly important during the morning because the outdoor air infiltrating the building during the cooling mode is typically cool and humid. As a result, little dehumidification will be accomplished by the conventional HVAC systems controlled by space temperature. It is therefore very advantageous to accomplish dehumidification in an energy efficient manner using the system of the present invention, which is capable of delivering process air at very low absolute humidity levels.

The system of the present invention preferably offers exceptional flexibility to respond to changing loads that occur in both the outdoor and indoor environments. The system of the present invention has the unique ability to respond to wide fluctuations in temperature and humidity of indoor and outdoor environments by modulating both the cooler and the rotational speed of the dehumidification wheel.

At any given time, a facility can be faced with any of the following conditions: 1) the controlled space is too hot, humidity acceptable; 2) the controlled space is too hot and too humid; 3) the controlled space is too cool, humidity acceptable; and 4) the controlled space is too cool and too humid. The system of the present invention has the advantage over conventional HVAC systems of being able to respond to various combinations of temperature and humidity, including the conditions described above, in an energy efficient manner and while providing humidity levels well below that possible with other conventional approaches.

In accordance with one embodiment of the method of the present invention, the system may be used to control temperature and humidity levels under the condition where the controlled space is too hot and the humidity level is acceptable or too dry. In the case where the controlled space could benefit from additional sensible cooling from the system and the humidity level in the controlled space is at or below its desired set point, the cooling coil can preferably be operated at increased capacity by increasing the amount of chilled water to the coil (if using chilled water) or increasing the number of stages of cooling (if using a DX system) as required and the dehumidification wheel can preferably be slowed to minimize its reheat function or, if desired, stopped. The dehumidification wheel is preferably driven by motor served by a frequency inverter that receives a signal from the temperature/humidity controller. Therefore, it can be preferably be operated at either a very slow speed, stopped altogether or jogged (moved slightly) on an intermittent basis. This embodiment preferably provides the maximum sensible cooling capacity under these conditions. As shown by FIG. 4, as the wheel speed approaches 0 revolutions per minute, the amount of reheat provided by the dehumidification wheel also approaches 0. If the space humidity is acceptable and requires no further dehumidification, operating the dehumidification wheel at or near 0 rpm will provide the maximum sensible cooling output from the system (coldest air delivered) and, as a result, the controller "17 (shown in FIGS. 3A–3E)" (preferably a direct digital controller "DDC") serving the system will operate the dehumidification wheel at the minimum wheel speed, stopped or jogged, while increasing the cooling output to its maximum level to create the coldest air possible, until the space temperature requirement is met.

Referring to FIG. 3B, as an example of the temperature and humidity control of this embodiment of the present invention, supply air 10a entering the system may be, for example, at a temperature of 95° F. with an absolute humidity level of 80 grains. After passing through the total energy recovery device 12, the temperature of the supply air 10b may be reduced to approximately 78° F. and the absolute humidity level reduced to approximately 61 grains. After passing through the cooler 14, the temperature of the supply air 10c may be further reduced to approximately 55° F., and in some instances, for example, when the space humidity is too low, with no further reduction in the absolute humidity level. Supply air 10c then passes through the dehumidification wheel 16 (which is, for example, stopped) without any resulting change in temperature or humidity level. Supply air 10d enters the controlled space "9" at a temperature of approximately 55° F. and an absolute humidity level of approximately 61 grains. On the exhaust side, exhaust air 20a leaving the controlled space "9" may be, for example, at a temperature of approximately 78° F. with an absolute humidity level of approximately 55 grains. Exhaust air 20a passes through the dehumidification wheel 16 with no change in temperature or humidity level. Hence, exhaust air 20b entering the total energy recovery device 12 may be at a temperature of approximately 78° F. with an absolute humidity level of approximately 55 grains. Those skilled in the art will appreciate that the level of temperature and humidity control achieved by this system is a function of many operating parameters. As such, the temperatures and humidity levels are provided by way of a example only and should not be construed as a limitation.

In accordance with another embodiment of the method of the present invention, the system is used to control temperature and humidity under the condition where the controlled space is too hot and too humid. This condition is typical of an application where the building owner chooses to shut off the building air conditioning system over the weekend because the building is unoccupied, in an attempt to save the cost of conditioning the facility. During the cooling season, the building can often be too hot and humid when the air conditioning system is energized on Monday morning. In such a case, where the controlled space could benefit from both some added sensible cooling and significant dehumidification, the cooling coil is preferably operated at its maximum output (maximum chilled water flow or stages of cooling operating) and the dehumidification wheel is preferably modulated at its optimum speed (e.g., 0.15 RPM) to provide the best mix of both sensible cooling and dehumidification. In this embodiment, cool, very dry air can preferably be provided to the controlled space as required.

Referring to FIG. 3C, as an example of the temperature and humidity control of this embodiment, supply air 10a entering the system may be, for example, at a temperature of 95° F. with an absolute humidity level of 125 grains. After passing through the total energy recovery device 12, the temperature of the supply air 10b may be reduced to approximately 77° F. and the absolute humidity level reduced to approximately 91 grains. After passing through the cooler 14, the temperature may be further reduced to approximately 55° F. and the absolute humidity level reduced to approximately 60 grains. After passing through the dehumidification wheel 16, the supply air 10d is warmed to approximately 62° F. and further dehumidified to an absolute humidity level of approximately 45 grains. On the exhaust side, exhaust air 20a leaving the controlled space "9" may be at, for example, a temperature of approximately 78° F. with an absolute humidity level of approximately 65 grains. After passing through the dehumidification wheel 16, the exhaust air 20b is cooled and humidified to approximately 71° F. and 80 grains, and is then introduced to the exhaust air side of the total energy recovery device 12. Those skilled in the art will appreciate that the level of temperature and humidity control achieved by this system is a function of many operating parameters. As such, the temperatures and humidity levels are provided by way of a example only and should not be construed as a limitation.

In accordance with another embodiment of the method of the present invention, the system is used to control temperature and humidity under the condition where the controlled space is too cool and the humidity level is as desired. In the case where the controlled space humidity set point is met and the controlled space is too cool, the cooling output from the cooler is reduced (e.g., the chilled water flow is reduced or stages of DX cooling are cycled off) and the speed of the dehumidification wheel is increased (e.g., 2 RPM) to provide maximum reheat effectiveness possible while still delivering supply air at the humidity content similar to that desired within the controlled space. In this embodiment, relatively warm, less dried, slightly dried or undried air can preferably be provided to the controlled space as required.

Referring to FIG. 3D, as an example of the temperature and humidity control of this embodiment, supply air 10a entering the system may be, for example, at a temperature of 80° F. with an absolute humidity level of 80 grains. After passing through the total energy recovery device 12, the temperature of the supply air 10b may be reduced to approximately 72° F. and the absolute humidity level reduced to approximately 61 grains. After passing through the cooler 14, the temperature may be further reduced to approximately 67° F. with no further reduction in the absolute humidity level. After passing through the dehumidification wheel 16, the supply air 10d is warmed to approximately 72° F. and further dehumidified to an absolute humidity level of approximately 59 grains, where the air is supplied to the controlled space "9". On the exhaust side, exhaust air 20a leaving the controlled space "9" may be at, for example, a temperature of approximately 73° F. with an absolute humidity level of approximately 55 grains. After passing through the dehumidification wheel 16, exhaust air 20b entering the total energy recovery device 12 is at a temperature of approximately 69° F. with an absolute humidity level of approximately 55 grains. Those skilled in the art will appreciate that the level of temperature and humidity control achieved by this system is a function of many operating parameters. As such, the temperatures and humidity levels are provided by way of a example only and should not be construed as a limitation.

In accordance with another embodiment of the method of the present invention, the system is used to control temperature and humidity under the condition where controlled space is too cool and too humid. In the case where the controlled space humidity is too high and the controlled space is too cool, the cooling coil is preferably operated at its maximum output so that it dehumidifies the outdoor air entering the dehumidification wheel, and the dehumidification wheel is modulated to optimize both its dehumidification and reheat capability (e.g., approximately 0.66 RPM). In this embodiment, warm, very dry air can preferably be provided to the controlled space as required.

Referring to FIG. 3E, as an example of the temperature and humidity control of the embodiment this embodiment, supply air 10a entering the system may be, for example, at a temperature of 85° F. with an absolute humidity level of 130 grains. After passing through the total energy recovery device 12, the temperature of the supply air 10b may be reduced to approximately 68° F. and the absolute humidity level of approximately 94 grains. After passing through the cooler 14, the temperature of the supply air 10c may be further reduced to approximately 57° F. and the absolute humidity level reduced to approximately 65 grains. After passing through the dehumidification wheel 16, the supply air 10d is warmed to approximately 67° F. and further dehumidified to an absolute humidity level of approximately 48 grains. On the exhaust side, exhaust air 20a leaving the controlled space "19" may be at, for example, a temperature of approximately 73° F. with an absolute humidity level of approximately 65 grains. After passing through the dehumidification wheel 16, exhaust air 20b entering the total energy recovery device 12 is at a temperature of approximately 63° F. with an absolute humidity level of approximately 82 grains. Those skilled in the art will appreciate that the level of temperature and humidity control achieved by this system is a function of many operating parameters. As such, the temperatures and humidity levels are provided by way of a example only and should not be construed as a limitation.

The system of the present invention is able to respond to various temperature and humidity swings within the controlled space, significantly enhancing the acceptability of indoor air quality. By applying the preferred and readily available direct digital control method ("DDC controls") the performance of a given system can be easily monitored, optimized and controlled.

The system and method of the present invention preferably provides a high degree of latent cooling with a minimum amount of conventional cooling input. For example, a 10,000 cfm system can handle as much as 50 tons of latent load (with 68 tons of total load) with only a 32 ton conventional cooling input.

During the heating mode, both the total energy recovery device and the dehumidification wheel can preferably be operated to recover more than 90% of the energy (temperature and humidity) required to heat and humidify the supply air stream to the condition of the exhaust air stream leaving the controlled space. In most cases, this level of recovery allows the controlled space to be self heating, even on very cold days, once normal lighting and people loads are introduced to the controlled space. This preferably provides outdoor air to the controlled space at nearly the same temperature and humidity level as the air being exhausted from the controlled space. This temperature and humidity control is not often feasible with conventional dual wheel systems because the sensible wheel in such conventional systems precools the exhaust air without reducing its humidity content. As a result, frosting conditions are easily encountered in cold climates, causing the sensible wheel in conventional systems to frequently shut off, limiting the recovery effectiveness to that of the total energy recovery wheel alone (e.g., approximately 70%–80%).

The system and method of the present invention can preferably be used to control humidity levels in unoccupied facilities. During unoccupied times, research has shown that the building materials (e.g., carpeting, furnishings, etc.) act as a humidity storage site as the humidity level rises. This rise in humidity is typical because many building operators reduce the capacity of or cycle off the HVAC system in an attempt to conserve energy. Because the sensible load in unoccupied buildings is minimal, controlling humidity can only be accomplished effectively if reheat is utilized after the air leaves the cooling coil. This reheat capability is seldom designed into projects or utilized if the capability exists. The system and method of the present invention preferably provides an effective solution to either "dry out" the humidity stored in the building materials after the HVAC system has been cycled off for an extended period or to provide the humidity control during unoccupied periods because additional reheat is preferably not required by the system of the present invention because it is provided by the dehumidification wheel.

The system of the present invention can preferably be controlled to reduce the quantity of outdoor air as a function of building occupants (e.g., $CO_2$ control). This control allows schools, for example, to be humidity controlled during the summer vacation with very low airflow rates through the system when compared to the flow volume delivered when the controlled space is occupied. Reducing the flow through the system preferably results in reduced fan horsepower, reduced chilled water requirements at the cooling coil, increased recovery efficiency at the total energy recovery wheel and the ability to provide drier air from the desiccant-based dehumidification wheel. In this way, the system of the present invention preferably provides an excellent solution to humidity control of facilities during unoccupied periods, recommended by ASHRAE Standard 62-1989 to avoid microbial contamination in hot and humid climates.

It should be recognized that the values provided in the figures and examples contained herein are by way of example only. The degree of temperature and humidity control recognized by the system and method of the present invention is a function of many operating parameters, for example, the desiccant material used, the air velocity through the system, the return air temperature and humidity content and the geometry of the desiccant-based dehumidification wheel matrix.

Though the present invention has been described in considerable detail with reference to certain presently preferred embodiments and examples thereof, other embodiments and examples will be apparent to those skilled in the art from consideration of this specification or practice of the invention disclosed herein. Among many uses, the system and method of the present invention may be used to control the temperature and humidity and ventilate the air of interior spaces of any type of facility. Additional uses of the system and method of the present invention may include any application in which temperature and humidity control is sought. Therefore, the spirit and scope of the appended claims should not be limited to the description of the preferred embodiments or examples contained herein.

I claim:

1. A system for controlling the temperature and humidity level of a controlled space, the system comprising:
    a) an air supplier adapted to supply air to the controlled space, creating a supply air steam;
    b) an air exhauster adapted to exhaust air out of the controlled space, creating an exhaust air stream adjacent to the supply air stream;
    c) a partition disposed between the supply and exhaust air streams that separates the supply and exhaust air streams;
    d) a total energy recovery device in contact with the supply air stream and exhaust air stream that exchanges heat and moisture between the supply and exhaust air streams;
    e) a dehumidification wheel positioned to rotate through the supply air stream and the exhaust air stream that exchanges heat and moisture between the supply and exhaust air streams; and
    f) a cooler disposed in the supply air stream between the total energy recovery device and the dehumidification wheel, the cooler adapted to cool and dehumidify the supply air stream.

2. The system of claim 1 wherein the dehumidification wheel is a desiccant-based dehumidification wheel.

3. The system of claim 1 wherein the total energy recovery device is a desiccant-based total energy recovery device.

4. The system of claim 1 wherein the dehumidification wheel is a passive dehumidification wheel.

5. The system of claim 1 wherein the cooler comprises a cooling coil.

6. The system of claim 1 wherein the supply air stream comprises air supplied from outside the controlled space.

7. The system of claim 1 wherein the supply air stream comprises air supplied from inside the controlled space.

8. The system of claim 1 wherein the total energy recovery device is a total energy recovery wheel positioned to rotate through the partitioned supply air stream and exhaust air stream.

9. The system of claim 8 wherein the dehumidification wheel is a desiccant-based dehumidification wheel.

10. The system of claim 8 wherein the total energy recovery wheel is a desiccant-based total energy recovery wheel.

11. The system of claim 8 wherein the dehumidification wheel is a passive dehumidification wheel.

12. The system of claim 8 wherein the cooler comprises a cooling coil.

13. The system of claim 8 wherein the supply air stream comprises air supplied from outside the controlled space.

14. The system of claim 8 wherein the supply air stream comprises air supplied from inside the controlled space.

15. The system of claim 8 having a cooling/dehumidification mode wherein:
a) the total energy recovery wheel has a dry and cool zone and a moist and warm zone;
b) the total energy recovery wheel communicates with the air supplier such that the supply air steam is passed through the dry and cool zone of the total energy recovery wheel as it rotates through the supply air stream, thereby cooling and dehumidifying the supply air stream;
c) the total energy recovery wheel communicates with the air exhauster such that the exhaust air stream is passed through the moist and warm zone of the total energy recovery wheel as it rotates through the exhaust air stream, thereby cooling and drying the total energy recovery wheel;
d) the cooler communicates with the air supplier such that the supply air stream is passed through the cooler after leaving the total energy recovery wheel, thereby further cooling and dehumidifying the supply air stream;
e) the dehumidification wheel has a warm and dry zone and a cool and moist zone;
f) the dehumidification wheel communicates with the air supplier such that the supply air stream leaving the cooler is passed through the warm and dry zone of the dehumidification wheel as it rotates through the supply air stream, thereby warming and further dehumidifying the supply air stream; and
g) the dehumidification wheel communicates with the air exhauster such that the exhaust air stream is passed through the cool and moist zone of the dehumidification wheel as it rotates through the exhaust air stream, thereby warming and drying the dehumidification wheel.

16. The system of claim 8 wherein the dehumidification wheel rotates at a controlled speed, the system further comprising a speed controller for adjusting the rotational speed of the dehumidification wheel.

17. A method of operating the system of claim 16 wherein the rotational speed of the dehumidification wheel is adjusted so as to control the level of heat and moisture exchanged by the dehumidification wheel.

18. The system of claim 8 wherein the cooler has a controlled cooling output, the system further comprising a cooling controller for adjusting the cooling output of the cooler.

19. A method of operating the system of claim 18 wherein the cooling output of the cooler is adjusted so as to control the level of cooling or dehumidification provided by the cooler.

20. The system of claim 8 wherein the dehumidification wheel rotates at a controlled speed, the system further comprising a speed controller for adjusting the rotational speed of the dehumidification wheel, and wherein the cooler has a controlled cooling output, the system further comprising a cooling controller for adjusting the cooling output of the cooler.

21. A method of operating the system of claim 20 for cooling a controlled space without substantially adjusting the humidity of the controlled space, the method comprising the steps of:
a) increasing the cooling output of the cooler; and
b) reducing the rotational speed of the dehumidification wheel to a predetermined range within which the dehumidification wheel provides a reduced level of heating or no heating to the supply air stream.

22. A method of operating the system of claim 20 for cooling and dehumidifying a controlled space, the method comprising the steps of:
a) increasing the cooling output of the cooler; and
b) adjusting the rotational speed of the dehumidification wheel to a predetermined range within which the dehumidification wheel provides a reduced level of heating and an increased level of dehumidification to the supply air stream.

23. A method of operating the system of claim 20 for heating a controlled space without substantially adjusting the humidity of the controlled space, the method comprising the steps of:
a) reducing the output of the cooler such that delivered humidity content of the air entering the controlled space approximates that desired within the controlled space; and
b) increasing the rotational speed of the dehumidification wheel to a predetermined range within which the dehumidification wheel provides an increased level of heating and a decreased level of dehumidification to the supply air stream.

24. A method of operating the system of claim 20 for heating and dehumidifying a controlled space, the method comprising the steps of:
a) increasing the cooling output of the cooler such that the cooler dehumidifies the supply air entering the dehumidification wheel; and
b) adjusting the rotational speed of the dehumidification wheel to a predetermined range within which the dehumidification wheel provides an increased level of both heating and dehumidification to the supply air stream.

25. The system of claim 1 having a cooling/dehumidification mode wherein:
the total energy recovery device has a dry and cool zone and a moist and warm zone;
b) the total energy recovery device communicates with the air supplier such that the supply air steam is passed through the dry and cool zone of the total energy recovery device, thereby cooling and dehumidifying the supply air stream;

c) the total energy recovery device communicates with the air exhauster such that the exhaust air stream is passed through the moist and warm zone of the total energy recovery device, thereby cooling and drying the total energy recovery device;

d) the cooler communicates with the air supplier such that the supply air stream is passed through the cooler after leaving the total energy recovery device, thereby further cooling and dehumidifying the supply air stream;

e) the dehumidification wheel has a warn and dry zone and a cool and moist zone;

f) the dehumidification wheel communicates with the air supplier such that the supply air stream leaving the cooler is passed through the warn and dry zone of the dehumidification wheel as it rotates through the supply air stream, thereby warming and further dehumidifying the supply air stream; and g) the dehumidification wheel communicates with the air exhauster such that the exhaust air stream is passed through the cool and moist zone of the dehumidification wheel as it rotates through the exhaust air stream, thereby warming and drying the dehumidification wheel.

26. The system of claim 1 wherein the dehumidification wheel rotates at a controlled speed, the system further comprising a speed controller for adjusting the rotational speed of the dehumidification wheel.

27. A method of operating the system of claim 26 wherein the rotational speed of the dehumidification wheel is adjusted so as to control the level of heat and moisture exchanged by the dehumidification wheel.

28. The system of claim 1 wherein the cooler has a controlled cooling output, the system further comprising a cooling controller for adjusting the cooling output of the cooler.

29. A method of operating the system of claim 28 wherein the cooling output of the cooler is adjusted so as to control the level of cooling or dehumidification provided by the cooler.

30. The system of claim 1 wherein the dehumidification wheel rotates at a controlled speed, the system further comprising a speed controller for adjusting the rotational speed of the dehumidification wheel, and wherein the cooler has a controlled cooling output, the system further comprising a cooling controller for adjusting the cooling output of the cooler.

31. A method of operating the system of claim 30 for cooling a controlled space without substantially adjusting the humidity of the controlled space, the method comprising the steps of:

a) increasing the cooling output of the cooler; and b) reducing the rotational speed of the dehumidification wheel to a predetermined range within which the dehumidification wheel provides a reduced level of heating or no heating to the supply air stream.

32. A method of operating the system of claim 30 for cooling and dehumidifying a controlled space, the method comprising the steps of:

a) increasing the cooling output of the cooler; and b) adjusting the rotational speed of the dehumidification wheel to a predetermined range within which the dehumidification wheel provides a reduced level of heating and an increased level of dehumidification to the supply air stream.

33. A method of operating the system of claim 30 for heating a controlled space without substantially adjusting the humidity of the controlled space, the method comprising the steps of:

a) reducing the output of the cooler such that delivered humidity content of the air entering the controlled space approximates that desired within the controlled space; and b) increasing the rotational speed of the dehumidification wheel to a predetermined range within which the dehumidification wheel provides an increased level of heating and a decreased level of dehumidification to the supply air stream.

34. A method of operating the system of claim 30 for heating and dehumidifying a controlled space, the method comprising the steps of:

a) increasing the cooling output of the cooler such that the cooler dehumidifies the supply air entering the dehumidification wheel; and b) adjusting the rotational speed of the dehumidification wheel to a predetermined range within which the dehumidification wheel provides an increased level of both heating and dehumidification to the supply air stream.

35. A system for controlling the temperature and humidity of a controlled space, the system comprising:

a) a supply fan adapted to supply air to the controlled space, creating a supply air steam;

b) an exhaust fan adapted to exhaust air out of the controlled space, creating an exhaust air stream adjacent to the supply air stream;

c) a partition disposed between the supply and exhaust air streams that separates the supply and exhaust air streams;

d) a desiccant-based total energy recovery wheel positioned to rotate through the partitioned supply air stream and exhaust air stream that exchanges heat and moisture between the supply and exhaust air streams;

e) a desiccant-based passive dehumidification wheel positioned to rotate through the supply air stream and the exhaust air stream that exchanges heat and moisture between the supply and exhaust air streams;

f) a speed controller for adjusting the rotational speed of the dehumidification wheel so as to control the level of heat and moisture exchanged by the dehumidification wheel;

g) a cooling coil disposed in the supply air stream between the total energy recovery wheel and the dehumidification wheel, the cooling coil adapted to cool and dehumidify the supply air stream; and h) a cooling controller for adjusting the cooling output of the cooling coil so as to adjust the level of cooling and dehumidification provided by the cooling coil.

36. A system for controlling the temperature and humidity of a controlled space, the system comprising:

a) an air supplier adapted to supply air to the controlled space, creating a supply air steam;

b) an air exhauster adapted to exhaust air out of the controlled space, creating an exhaust air stream adjacent to the supply air stream;

c) a partition disposed between the supply and exhaust air streams that separates the supply and exhaust air streams;

d) a sensible energy recovery device in contact with the supply air stream and exhaust air stream that exchanges heat between the supply and exhaust air streams;

e) a dehumidification wheel positioned to rotate through the supply air stream and the exhaust air stream that exchanges heat and moisture between the supply and exhaust air streams; and f) a cooler disposed in the supply air stream between the total energy recovery wheel and the dehumidification wheel, the cooler adapted to cool and dehumidify the supply air stream.

37. A method of controlling the temperature and humidity of a controlled space, the method comprising the steps of:

a) supplying air to the controlled space and exhausting air from the controlled space, creating a supply air stream and an exhaust air stream;

b) providing a total energy recovery device having a dry and cool zone and a moist and warm zone, for cooling and dehumidifying the supply air stream;

c) cooling and dehumidifying the supply air stream by passing it through the dry and cool zone of the total energy recovery device;

d) cooling and drying the total energy recovery device by passing the exhaust air stream through the moist and warm zone of the total energy recovery device;

e) providing a cooler for further cooling and dehumidifying the supply air stream;

f) further cooling and dehumidifying the supply air stream by passing the supply air steam through the cooler, g) providing a rotating dehumidification wheel for warming and further dehumidifying the supply air stream;

h) warming and further dehumidifying the supply air stream by passing the supply air stream through the warm and dry zone of the rotating dehumidification wheel; and i) warming and drying the dehumidification wheel by passing the exhaust air stream through the dehumidification wheel.

38. The method of claim 37 wherein the dehumidification wheel is a passive dehumidification wheel.

39. The method of claim 37 wherein the dehumidification wheel is a desiccant-based dehumidification wheel.

40. The method of claim 37 wherein the total energy recovery device is a desiccant-based total energy recovery device.

41. The method of claim 37 further comprising the step of controlling the rotational speed of the dehumidification wheel to adjust the level of heating or dehumidification provided to the supply air stream.

42. The method of claim 37 further comprising the step of controlling the output of the cooler to adjust the level of cooling or dehumidification provided to the supply air stream.

43. The method of claim 37 further comprising the steps of controlling the rotational speed of the dehumidification wheel to adjust the level of heating or dehumidification provided to the supply air stream, and controlling the output of the cooler to adjust the level of cooling or dehumidification provided to the supply air stream.

44. A method of controlling the temperature and humidity of a controlled space, the method comprising the steps of:

a) supplying air to the controlled space and exhausting air from the controlled space, creating a supply air stream and an exhaust air stream;

b) providing a rotating total energy recovery wheel having a dry and cool zone and a moist and warm zone, for cooling and dehumidifying the supply air stream;

c) cooling and dehumidifying the supply air stream by passing it through the dry and cool zone of the rotating total energy recovery wheel;

d) cooling and drying the total energy recovery wheel by passing the exhaust air stream through the moist and warm zone of the rotating total energy recovery wheel;

e) providing a cooler for further cooling and dehumidifying the supply air stream;

f) further cooling and dehumidifying the supply air stream by passing the supply air steam through the cooler, g) providing a rotating dehumidification wheel for warming and further dehumidifying the supply air stream;

h) warming and further dehumidifying the supply air stream by passing the supply air stream through the warm and dry zone of the rotating dehumidification wheel; and i) warming and drying the dehumidification wheel by passing the exhaust air stream through the dehumidification wheel.

45. The method of claim 44 wherein the dehumidification wheel is a passive dehumidification wheel.

46. The method of claim 44 wherein the dehumidification wheel is a desiccant-based dehumidification wheel.

47. The method of claim 44 wherein the total energy recovery wheel is a desiccant-based total energy recovery wheel.

48. The method of claim 44 further comprising the step of controlling the rotational speed of the dehumidification wheel to adjust the level of heating or dehumidification provided to the supply air stream.

49. The method of claim 44 further comprising the step of controlling the output of the cooler to adjust the level of cooling or dehumidification provided to the supply air stream.

50. The method of claim 44 further comprising the steps of controlling the rotational speed of the dehumidification wheel to adjust the level of heating or dehumidification provided to the supply air stream, and controlling the output of the cooler to adjust the level of cooling or dehumidification provided to the supply air stream.

51. A method of controlling the temperature and humidity of a controlled space, the method comprising the steps of:

a) supplying air to the controlled space and exhausting air from the controlled space, creating a supply air stream and an exhaust air stream;

b) providing a rotating desiccant-based total energy recovery wheel having a dry and cool zone and a moist and warm zone, for cooling and dehumidifying the supply air stream;

c) cooling and dehumidifying the supply air stream by passing it through the dry and cool zone of the rotating total energy recovery wheel;

d) cooling and drying the total energy recovery wheel by passing the exhaust air stream through the moist and warm zone of the rotating total energy recovery wheel;

e) providing a cooling coil for further cooling and dehumidifying the supply air stream;

f) controlling the output of the cooling coil to adjust the level of cooling or dehumidification provided to the supply air stream;

g) further cooling and dehumidifying the supply air stream by passing the supply air steam through the cooling coil;

h) providing a rotating passive desiccant-based dehumidification wheel for warming and further dehumidifying the supply air stream;

i) controlling the rotational speed of the dehumidification wheel to adjust the level of heating or dehumidification provided to the supply air stream;

j) warming and further dehumidifying the supply air stream by passing the supply air stream through the warm and dry zone of the rotating dehumidification wheel; and k) warming and drying the dehumidification wheel by passing the exhaust air stream through the dehumidification wheel.

* * * * *

UNITED STATES PATENT AND TRADEMARK OFFICE
CERTIFICATE OF CORRECTION

PATENT NO.    : 6,199,388 B1
DATED         : March 13, 2001
INVENTOR(S)   : Fischer, Jr.

It is certified that error appears in the above-identified patent and that said Letters Patent is hereby corrected as shown below:

Column 25,
Line 4, "total energy recovery wheel" should be changed to -- sensible energy recovery device --.

Signed and Sealed this

Sixteenth Day of November, 2004

JON W. DUDAS
*Director of the United States Patent and Trademark Office*